US012645023B2

(12) United States Patent
Zhu et al.

(10) Patent No.: US 12,645,023 B2
(45) Date of Patent: Jun. 2, 2026

(54) DISPLAY DEVICE FOR PROVIDING OUTPUT LIGHT FROM ONE SIDE

(71) Applicant: Shenzhen Optiave Display Technologies Co., Ltd., Shenzhen (CN)

(72) Inventors: Liangfu Zhu, Shenzhen (CN); Tapani Kalervo Levola, Shenzhen (CN); Yisheng Zhu, Shenzhen (CN)

(73) Assignee: Shenzhen Optiave Display Technologies Co., Ltd., Shenzhen (CN)

( * ) Notice: Subject to any disclaimer, the term of this patent is extended or adjusted under 35 U.S.C. 154(b) by 268 days.

(21) Appl. No.: 18/203,891

(22) Filed: May 31, 2023

(65) Prior Publication Data

US 2024/0345307 A1      Oct. 17, 2024

(30) Foreign Application Priority Data

Apr. 12, 2023    (CN) .......................... 202310438236.2

(51) Int. Cl.
F21V 8/00 (2006.01)
(52) U.S. Cl.
CPC ......... G02B 6/0036 (2013.01); G02B 6/0016 (2013.01)
(58) Field of Classification Search
None
See application file for complete search history.

(56) References Cited

U.S. PATENT DOCUMENTS 6,474,826 B1 * 11/2002 Tanaka ................. G02B 6/0018
362/555
2011/0043918 A1    2/2011 Crouse et al.
(Continued)

FOREIGN PATENT DOCUMENTS

CN        101611333       12/2009
CN        108027532       5/2018
(Continued)

OTHER PUBLICATIONS

Notification of Office Action and Search Report Dated Jul. 11, 2025 From National Intellectual Property Office of the People's Republic of China Re. Application No. 202310438236.2 and Its Translation Into English. (24 Pages).

*Primary Examiner* — Chad H Smith

(57) ABSTRACT

A display device (500) includes an expander device (EPE1) to form output light (OUT1) by diffractively expanding input light (IN1) that includes input light beams ($B0_{P1}$, $B0_{P2}$) representing an input image (IMG0). The output light (OUT1) includes output light beams ($B3_{P1}$, $B3_{P2}$) representing the input image (IMG0). The expander device (EPE1) includes: a waveguide plate (SUB1), a diffractive in-coupling element (DOE1) to couple the input light (IN1) into the waveguide plate (SUB1), a diffractive out-coupling element (DOE3) to form the output light (OUT1) by diffracting guided light (B1, B2) out of the waveguide plate (SUB1). The out-coupling element (DOE3) includes buried diffractive ridges (PR1) and complementing regions (FIL2) between the ridges (PR1), the buried diffractive ridges (PR1) have a first refractive index ($n_1$), the complementing regions (FIL2) have a second different refractive index ($n_2$). A slant angle ($\theta_S$) of the ridges (PR1) is in a range of 20° to 70°.

18 Claims, 14 Drawing Sheets

(56) References Cited

U.S. PATENT DOCUMENTS

| | | | |
|---|---|---|---|
| 2018/0172893 | A1 | 6/2018 | Fattal et al. |
| 2020/0033530 | A1* | 1/2020 | Colburn ................. H01J 37/20 |
| 2023/0037929 | A1* | 2/2023 | Lane .................... G02B 6/0076 |
| 2023/0075954 | A1 | 3/2023 | Levola et al. |
| 2024/0045121 | A1 | 2/2024 | Zhu |

FOREIGN PATENT DOCUMENTS

| | | |
|---|---|---|
| CN | 113075768 | 7/2021 |
| CN | 114137650 | 3/2022 |
| CN | 115079427 | 9/2022 |
| TW | 202314306 | 4/2023 |
| WO | WO 2023/015025 | 2/2023 |

* cited by examiner

Comparative Example

Comparative Example

Comparative Example

Comparative Example

DISPLAY DEVICE FOR PROVIDING OUTPUT LIGHT FROM ONE SIDE

CROSS-REFERENCE TO RELATED APPLICATIONS

This application claims the benefit of priority of Chinese Patent Application No. 202310438236.2 filed on Apr. 12, 2023, and titled "DISPLAY DEVICE, DISPLAYING METHOD, AND VEHICLE DISPLAY DEVICE", the contents of which are incorporated by reference as if fully set forth herein in their entirety.

FIELD

The present invention relates to a display device, which includes a diffractive beam expander.

BACKGROUND

Referring to FIG. 1, a known display apparatus includes an optical engine ENG1 and a diffractive expander device EPE0. The display apparatus may display a virtual image by diffractively expanding light beams provided by the optical engine ENG1. The diffractive expander device EPE0 provides an enlarged eye box BOX1 for viewing the displayed virtual image. The diffractive expander device EPE0 includes a waveguide plate SUB0, a diffractive in-coupling element DOE1, and a diffractive out-coupling element DOEX. The optical engine ENG1 forms input light IN1. The input light IN1 includes collimated input light beams ($B0_{P1}$, $B0_{P2}$), which propagate in different directions and correspond to different image points (P1, P2) of an input image (IMG0).

The diffractive expander device EPE0 forms output light OUT1 by diffractively expanding light beams of the input light IN1. For example, the diffractive expander device EPE0 forms an output light beam $B3_{P1,\ T-1}$ by diffractively expanding the light of the input light beam $B0_{P1}$.

The in-coupling element DOE1 forms guided light B1 by diffracting the input light IN1 into the waveguide plate SUB0. The out-coupling element DOEX forms output light OUT1 by diffracting guided light B1 out of the waveguide plate SUB0. For example, the in-coupling element DOE1 forms guided light $B1_{P1}$ corresponding to the image point P1 by diffracting the input light beam $B0_{P1}$ of the image point P1. The guided light $B1_{P1}$ propagates within the waveguide plate SUB0. The out-coupling element DOEX forms output light beams (e.g., $B3_{P1,\ T-1}$) by diffracting guided light (e.g., $B1_{P1}$) out of the waveguide plate SUB0. The output light beams may together constitute output light OUT1. The output light includes expanded output light beams ($B3_{P1,\ T-1}$, $B3_{P2,\ T-1}$), which propagate in different directions corresponding to the different image points (P1, P2) of the displayed image. A viewer may view the displayed virtual image when the output light beams of the output light OUT1 impinge on the eye EYE1 of the viewer.

The known out-coupling element DOEX may diffract light ($B3_{P1,\ T-1}$) through a first major surface (SRF1) of the waveguide plate (SUB0) towards an intended viewer (also referred to as a first viewer) (EYE1). However, some known out-coupling elements DOEX may diffract light ($B3_{P1,\ R-1}$) also through a second major surface (SRF2) of the waveguide plate (SUB0). Diffraction of guided light through the second major surface (SRF2) may reduce the brightness of the virtual image, which is displayed to the eye box BOX1.

Light diffracted through the second major surface (SRF2) is directed away from the eye box BOX1 and cannot be observed by the intended viewer.

Light diffracted through the second major surface (SRF2) may impinge on the eye EYE2 of a second viewer. Diffraction of guided light through the second major surface (SRF2) may allow viewing a displayed virtual image also from a second eye box BOX2. Light diffracted to the second eye box BOX2 may disturb the second viewer and/or may reveal confidential information to the second viewer.

SUMMARY

Objects include providing a display device and a method for displaying an image.

According to an aspect, there is provided a display device (500) including an expander device (EPE1) to form output light (OUT1) by diffractively expanding input light (IN1), wherein the input light (IN1) includes a plurality of input light beams ($B0_{P1}$, $B0_{P2}$) representing an input image (IMG0), and wherein the output light (OUT1) includes a plurality of output light beams ($B3_{P1}$, $B3_{P2}$) representing said input image (IMG0), wherein the expander device (EPE1) includes:

a waveguide plate (SUB1), a diffractive in-coupling element (DOE1) to couple the input light (IN1) into the waveguide plate (SUB1), a diffractive out-coupling element (DOE3) to form the output light (OUT1) by diffracting guided light (B1, B2) out of the waveguide plate (SUB1), wherein the out-coupling element (DOE3) includes a plurality of buried diffractive ridges (PR1), the out-coupling element (DOE3) includes complementing regions (FIL2) between the ridges (PR1), the buried diffractive ridges (PR1) have a first refractive index ($n_1$), the complementing regions (FIL2) have a second different refractive index ($n_2$), and wherein a slant angle ($\theta_S$) of the ridges (PR1) is in a range of 20° to 70°.

The scope of protection sought for various embodiments of the invention is set out by the independent claims. The embodiments, if any, described in this specification that do not fall under the scope of the independent claims are to be interpreted as examples useful for understanding various embodiments of the invention.

The display device may realize single-sided output. The display device includes a complemented out-coupling element, which may be arranged to provide only one eye box for viewing a displayed virtual image. The complemented out-coupling element may also provide substantially uniform intensity distribution within the eye box.

The complemented out-coupling element includes inclined buried diffractive ridges and complementing solid regions between the ridges. The solid regions may complement shape of the diffractive ridges. The out-coupling element may be called as, e.g., a complemented out-coupling element. The ridges and the complementing regions are transparent at wavelengths of the displayed image. The buried ridges have a first refractive index, and the complementing regions have a second different refractive index.

The eye box (BOX1) means a spatial region where an eye of a user may see the displayed virtual image. The user cannot see the displayed image when the eye is outside the eye box. The complemented out-coupling element may provide uniform intensity distribution of output light within the eye box. The eye box may have substantially uniform spatial intensity distribution, so that brightness of a given image point of the displayed virtual image may be substantially independent of a position of the eye within the eye box. Variation of observed brightness of the displayed image may be small or negligible in a situation where the user of the device moves his eye in transverse directions with respect to the out-coupling element. In an embodiment, the complemented out-coupling element may provide uniform intensity distribution of output light within a large eye box.

The display device is based on a diffractive expander device. An optical engine, i.e., a projector, may provide input light, which includes a plurality of input light beams corresponding to points of an input image. The input light beams propagate in different directions corresponding to the image points of the input image. Intensities of the input light beams correspond to the brightness of the image points of the input image. The display device includes a diffractive expander device to expand the input light. The diffractive expander device includes a waveguide plate, a diffractive in-coupling element, one or more optional intermediate diffractive elements, and a diffractive complemented out-coupling element. The in-coupling element couples the input light into the waveguide plate. The waveguide plate distributes guided light to the out-coupling element. The out-coupling element forms output light by diffracting the guided light out of the waveguide plate. A user may observe the displayed virtual image when output light beams of the output light impinge on the eye of the user. The diffractive expander device forms the output light beams by diffractively expanding the input light beams.

The display device may be used to display a virtual image. The display device may be used, e.g., as an augmented reality display, where the user may simultaneously observe a displayed virtual image in addition to a real object, which is viewed through the out-coupling element of the display device. The display device may be used, e.g., as a head-up display of a vehicle.

The out-coupling element may direct optical output power mainly to an intended viewing sector. For example, dimensions and materials of the ridges and the complementing regions may be selected such that more than 70% of the guided light is diffracted out of the waveguide plate through the first major surface of the waveguide plate, and less than 30% of the guided light is diffracted out of the waveguide plate through the second major surface of the waveguide plate.

The diffractive in-coupling element and one or more optional intermediate diffractive optical elements provide guided light, which propagates within the waveguide plate. The propagating guided light is confined to the waveguide plate by total internal reflection (TIR). Dimensions and materials of the complemented diffractive out-coupling element may be selected such that the out-coupling element couples, e.g., more than 70%, more than 80%, more than 90%, more than 95%, or more than 99% of the optical power of the guided light out of the waveguide plate through one major surface (SRF1 or SRF2) of the waveguide plate. Thus, e.g., less than 30%, less than 20%, less than 10%, less than 5%, or less than 1% of the optical power of the guided light may be coupled out of the waveguide plate through the other single major surface (SRF2 or SRF1) of the waveguide plate. The one-sided out-coupling may reduce the power consumption of the optical engine, as most of the guided light may be coupled out of the waveguide plate towards the intended viewer.

The complemented out-coupling element may have a first diffraction efficiency ($\eta_{T-1}$) for the first negative diffraction order ($-1$) in transmission (T). The complemented out-coupling element may have a second diffraction efficiency ($\eta_{R-1}$) for the first negative diffraction order ($-1$) in reflection (R). The dimensions and the materials of the complemented out-coupling element may be selected such that a ratio ($\eta_{T-1}$)/($\eta_{R-1}$) of the first diffraction efficiency ($\eta_{T-1}$) to the second diffraction efficiency ($\eta_{R-1}$) may be, e.g., greater than 3 or smaller than 1/3.

The transmission diffraction efficiency ($\eta_{T-1}$) of the out-coupling element may be, e.g., greater than 3 times the reflection diffraction efficiency ($\eta_{R-1}$) of the out-coupling element. Alternatively, the reflection diffraction efficiency ($\eta_{R-1}$) may be, e.g., greater than 3 times the transmission diffraction efficiency ($\eta_{T-1}$). In addition, a sum ($\eta_{T-1}+\eta_{R-1}$) of the transmission diffraction efficiency ($\eta_{T-1}$) and the reflection diffraction efficiency ($\eta_{R-1}$) may be, e.g., smaller than 20%.

As an additional criterion, the dimensions and the materials may be selected such that the first diffraction efficiency ($\eta_{T-1}$) or the second diffraction efficiency ($\eta_{R-1}$) are in a suitable range, so as to provide uniform intensity distribution within the eye box. If the diffraction efficiency for providing output light to the intended viewing sector is too high, the eye box may be too small, or the intensity distribution within the eye box may be nonuniform. On the other hand, if the diffraction efficiency is too low, the intensity within the eye box may be too low, or the optical engine of the display device needs to consume excessively high power.

The complemented out-coupling element may provide a large difference in diffraction efficiency between a transmission diffraction order and a reflection diffraction order by using a large grating depth ($d_1$) and an inclined orientation of the buried ridges. The complementing regions between the ridges may reduce out-coupling efficiency of a deep grating structure to a suitable level, for providing a substantially uniform spatial intensity distribution in the eye box. The ridges may have, e.g., a parallelogram, a trapezoidal, or a triangular profile. A cross-sectional shape of the ridges may be selected to further optimize angular intensity distribution of the output light.

BRIEF DESCRIPTION OF THE DRAWINGS

In the following examples, several variations will be described in more detail with reference to the appended drawings, in which.

DETAILED DESCRIPTION

Figure 1:
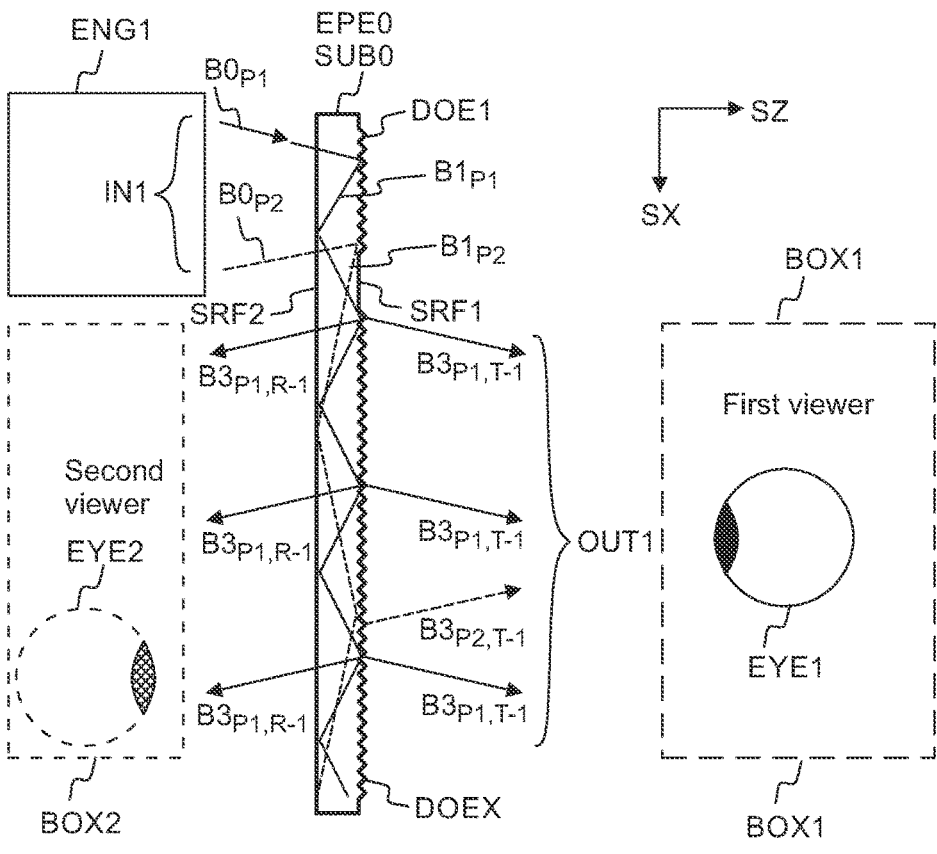
FIG. 1 shows a cross-sectional side view of a known display device.
Figure 2:
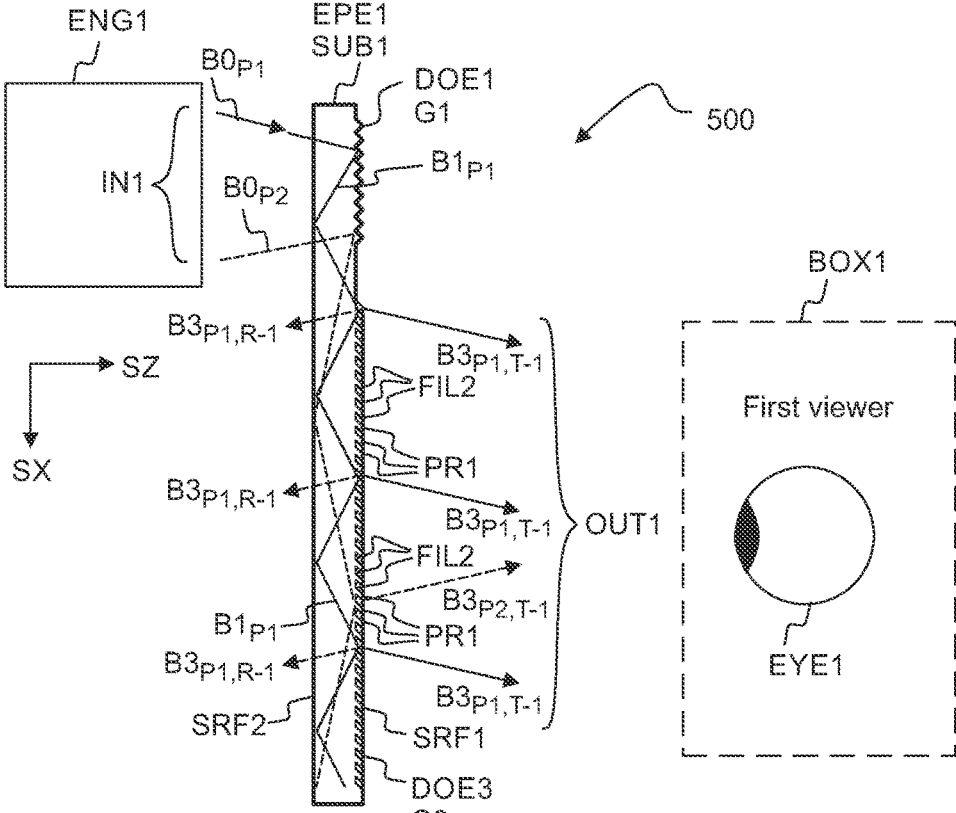
FIG. 2 shows a cross-sectional side view of a display device, which includes a complemented out-coupling element according to some embodiments of the present disclosure.

Referring to FIG. 2, a display device 500 may include an optical engine ENG1 to form input light IN1, and a diffractive expander device EPE1 to form output light OUT1 by diffractively expanding the input light IN1.

Figure 3:
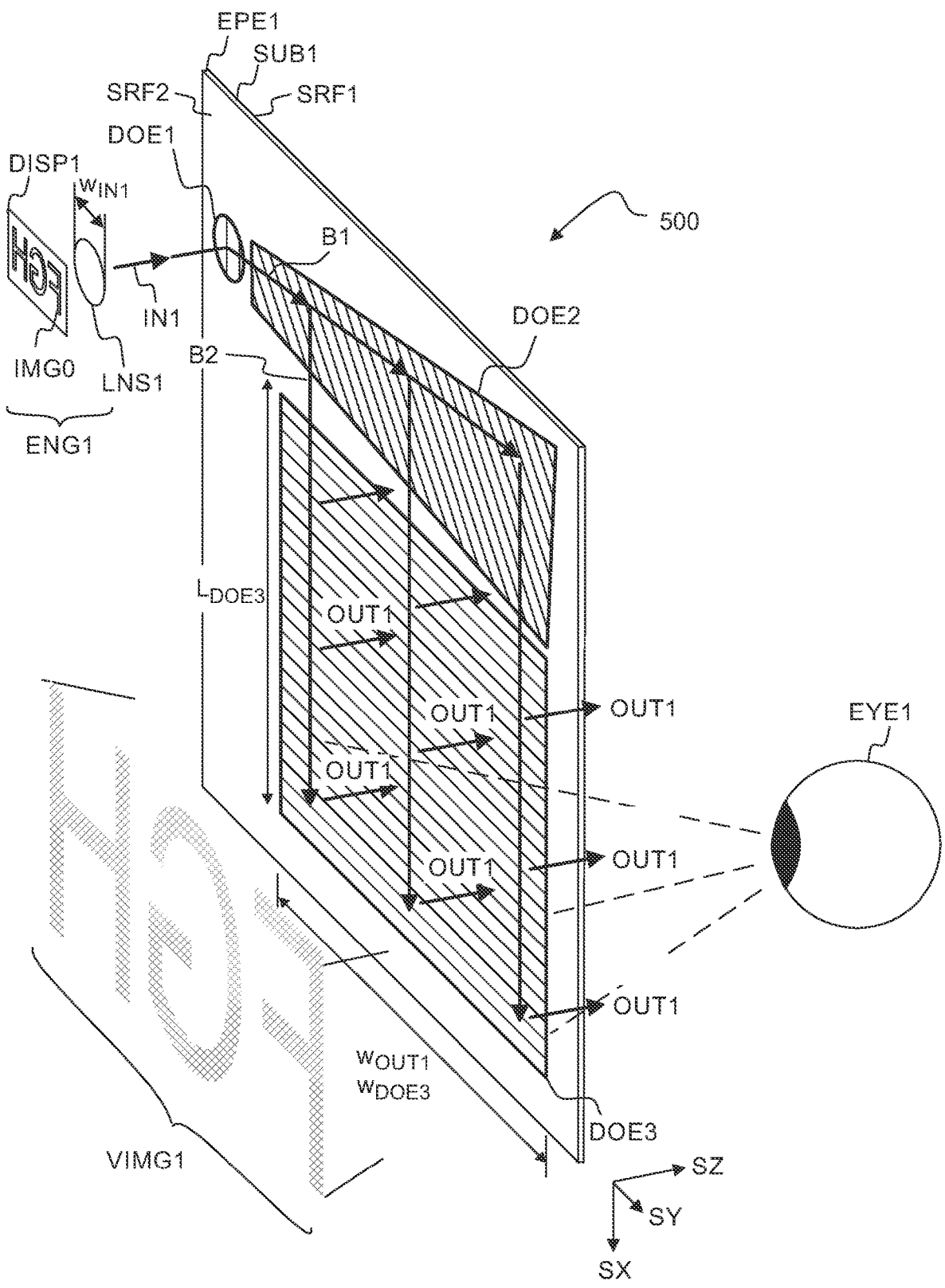
FIG. 3 shows a three-dimensional view of a display device, which includes the complemented out-coupling element, according to some embodiments of the present disclosure.

The optical engine ENG1 may provide the input light IN1, which includes a plurality of input light beams $B0_{P1}$ and $B0_{P2}$, which represent image points P1 and P2 of an input image IMG0. The input light IN1 includes the plurality of input light beams $B0_{P1}$ and $B0_{P2}$ which propagate in different directions, wherein the plurality of input light beams $B0_{P1}$, $B0_{P2}$ corresponds to the image points P1 and P2 of the input image IMG0 (FIG. 3).

The diffractive expander device EPE1 includes a waveguide plate SUB1, a diffractive in-coupling element DOE1, and a diffractive out-coupling element DOE3. The diffractive expander device EPE1 may receive the input light IN1 from the optical engine ENG1. The diffractive in-coupling element DOE1 may receive the input light IN1. The in-coupling element DOE1 forms guided light (B1, B2) by diffracting the input light IN1. The in-coupled light may propagate as the guided light (B1, B2) in the waveguide plate SUB1. The guided light (B1, B2) may be confined to the waveguide plate SUB1 by total internal reflection (TIR). The out-coupling element DOE3 forms the output light OUT1 by diffracting the guided light (B1, B2) out of the waveguide plate SUB1. The output light OUT1 includes a plurality of output light beams B3 corresponding to the image points P1 and P2 of the input image IMG0.

For example, the input light IN1 may include the input light beams $B0_{P1}$ and $B0_{P2}$, which correspond to the image points P1 and P2. The in-coupling element DOE1 may form guided light $B1_{P1}$ by diffracting the input light beam $B0_{P1}$. The in-coupling element DOE1 may form guided light $B1_{P2}$ by diffracting the input light beam $B0_{P2}$.

The out-coupling element DOE3 may form an output light beam $B3_{P1, T-1}$ by diffracting the guided light $B1_{P1}$. The out-coupling element DOE3 may form an output light beam $B3_{P2, T-1}$ by diffracting the guided light B1 P2. A viewer may see a displayed virtual image VIMG1 when the output light OUT1 impinges on an eye EYE1 of the viewer. The viewer may see the displayed virtual image VIMG1 when the eye EYE1 of the viewer is within an eye box BOX1 of the display device 500. The viewer may see the displayed image point P1 when the output light beam $B3_{P1, T-1}$ impinges on the eye EYE1 of the viewer. The viewer may see the displayed image point P2 when the output light beam $B3_{P2, T-1}$ impinges on the eye EYE1.

The waveguide plate SUB1 has a first major surface SRF1 and a second major surface SRF2. The in-coupling element DOE1 couples the input light IN1 into the waveguide plate SUB1 through the surface SRF1 or through the surface SRF2. The out-coupling element DOE3 diffracts the guided light (B1, B2) out of the waveguide plate SUB1 through the surface SRF1 or through the surface SRF2.

The in-coupling element DOE1 includes a grating G1 to diffract the input light IN1 into the waveguide plate SUB1.

The out-coupling element DOE3 includes a buried diffractive surface relief grating G3, which includes buried inclined diffractive ridges PR1 and solid complementing regions FIL2 between the ridges PR1. The grating G3 has a grating period $\Lambda_3$. The ridges PR1 have a first refractive index $n_1$. The complementing regions FIL2 are solid and have a second different refractive index $n_2$. The out-coupling element DOE3 has a grating period $\Lambda_3$.

The out-coupling element DOE3 may provide a large difference in diffraction efficiency between a transmission diffraction order ($T_{-1}$) and a reflection diffraction order ($R_{-1}$) by using a large grating depth and an inclined orientation of the buried ridges PR1. The complementing regions FIL2 between the ridges PR1 may reduce out-coupling efficiency of a deep grating structure to a suitable level, for providing a substantially uniform spatial intensity distribution in the eye box BOX1.

Referring to FIG. 3, the diffractive expander device EPE1 may optionally include one or more intermediate diffractive elements DOE2 located in an optical path between the in-coupling element DOE1 and the out-coupling element DOE3. For example, the diffractive expander device EPE1 may include a diffractive expander element DOE2 in an optical path between the in-coupling element DOE1 and the out-coupling element DOE3. The in-coupling element DOE1 may form first guided light B1 by diffracting the input light IN1. The expander element DOE2 may form second guided light B2 by diffracting the first guided light B1. The out-coupling element DOE3 may form the output light OUT1 by diffracting the second guided light B2. The eye EYE1 of the viewer may see the displayed virtual image VIMG1 when the output light OUT1 impinges on the eye EYE1.

The waveguide plate SUB1 includes several diffractive elements DOE1 and DOE3, which are configured to control a direction of light in an optical path. The expander device EPE1 may include a group of diffractive elements DOE1, DOE2, and DOE3, which are configured to control a direction of the output light beams of the output light OUT1.

The optical engine ENG1 may include a micro display DISP1 to form the input image IMG0. The optical engine ENG1 may include optics LNS1 to form input light beams $B0_{P1}$ and $B0_{P2}$ from light of the image points P1 and P2 of the input image IMG0. The input light beams $B0_{P1}$ and $B0_{P2}$ may have a width $w_{IN1}$. The output light beams may have a width $w_{OUT1}$. The width $w_{OUT1}$ may be greater than the width $w_{IN1}$. The diffractive expander device EPE1 may form the output light OUT1 by diffractively expanding the input light IN1.

SX, SY, and SZ denote orthogonal directions. The first major surface SRF1 may be in a plane defined by the directions SX and SY. The second major surface SRF2 may be parallel with the first major surface SRF1.

For example, the complemented out-coupling element DOE3 may have a length $L_{DOE3}$ in the direction SX, and the complemented out-coupling element DOE3 may have a width $w_{DOE3}$ in the direction SY. The width $w_{OUT1}$ of the output light beams may be smaller than or equal to the width $w_{DOE3}$ of the complemented out-coupling element DOE3.

Figure 4A:
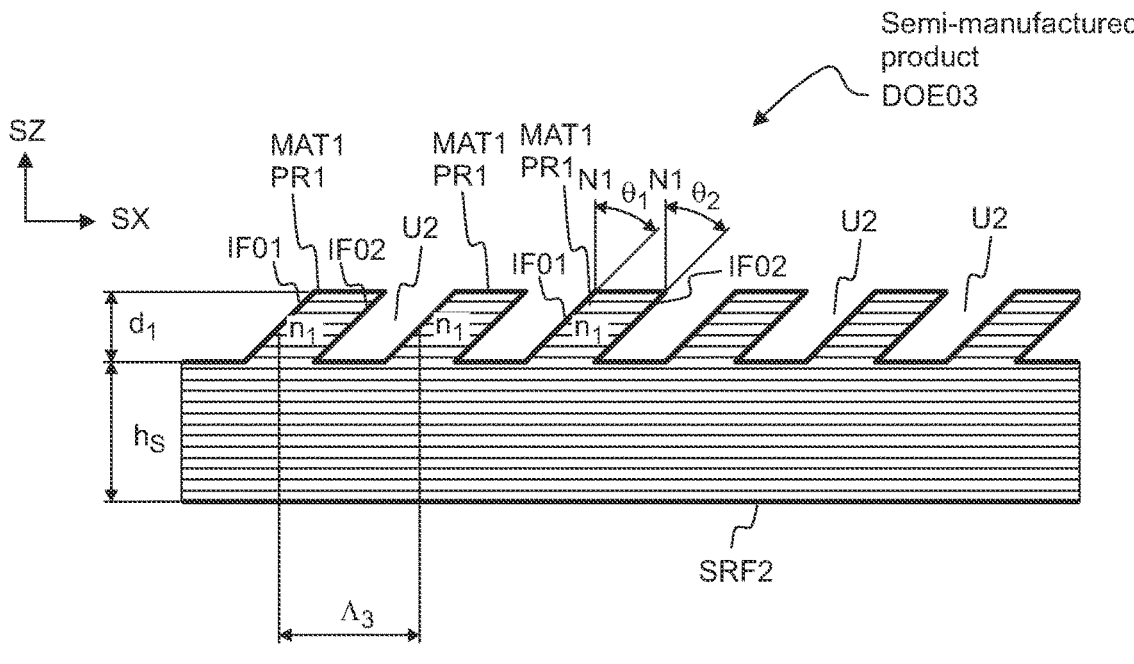
FIG. 4a shows a cross-sectional side view of a semi-manufactured out-coupling element according to some embodiments of the present disclosure.

Referring to FIG. 4a, a semi-manufactured element DOE03 may include a plurality of inclined ridges PR1, which consist of a first material MAT1, and which have a first refractive index $n_1$. The ridges PR1 are positioned at equally spaced locations, so as to provide a grating period $\Lambda_3$. The semi-manufactured element DOE03 includes a plurality of grooves U2 between the ridges PR1. A ridge PR1 and a first adjacent groove U2 have a common interface (i.e., a first interface IF01), and the ridge PR1 and a second adjacent groove U2 have a common interface (i.e., a second interface IF02). The first interface IF01 has a first slant angle $\theta_1$ with respect to a normal N1 of the major surface SRF1. The second surface IF02 has a second slant angle $\theta_2$ with respect to the normal N1 of the major surface SRF1. The slant angle $\theta_S$ of the ridges PR1 is equal to an average of the slant angles $\theta_1$ and $\theta_2$ of the interfaces IF01 and IF02.

Figure 4B:
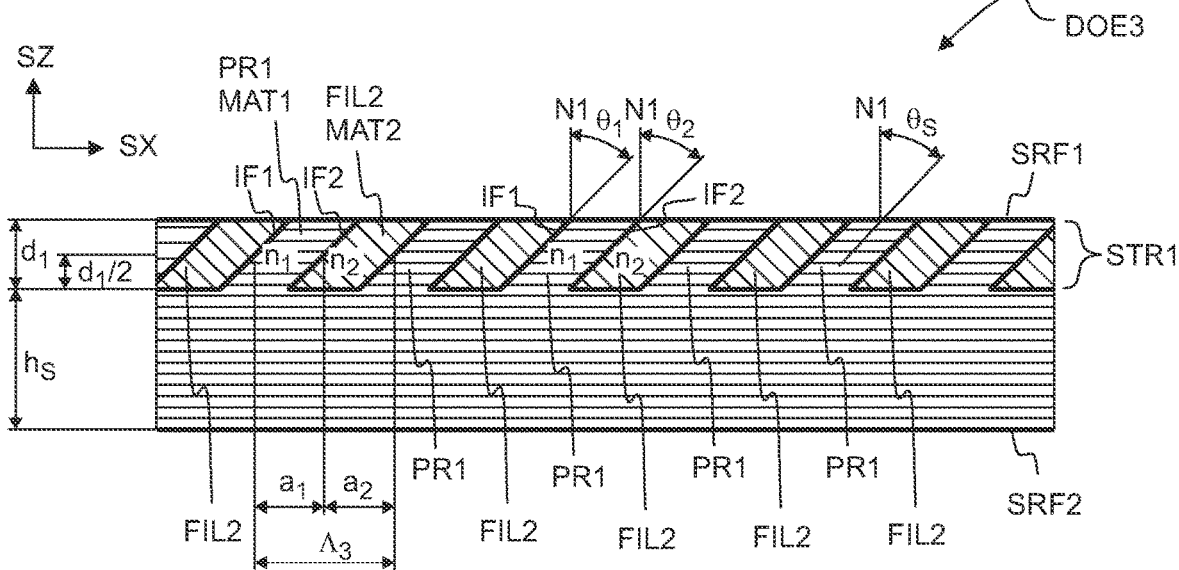
FIG. 4b shows a cross-sectional side view of a complemented out-coupling element according to some embodiments of the present disclosure.
Figure 4C:
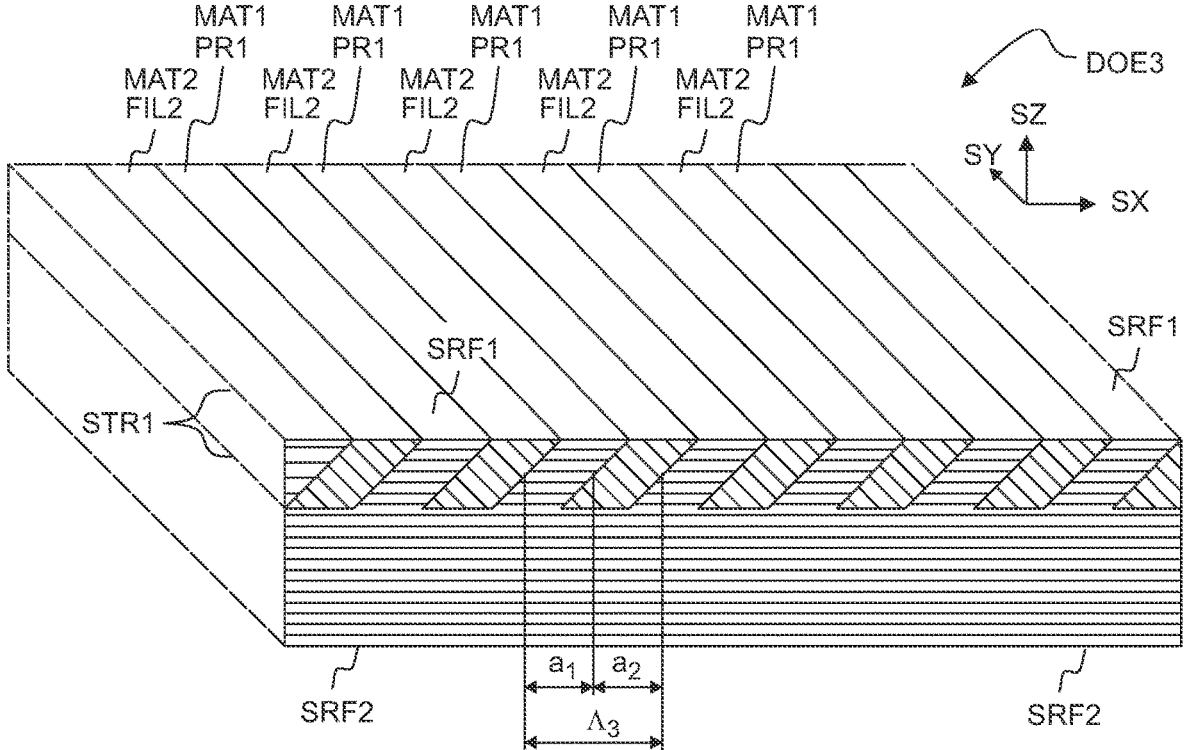
FIG. 4c shows a three-dimensional view of a complemented out-coupling element according to some embodiments of the present disclosure.

Referring to FIGS. 4b and 4c, the complemented out-coupling element DOE3 includes buried inclined ridges PR1 and solid complementing regions FIL2 between the ridges PR2. The buried ridges PR1 and the complementing regions FIL2 may together form a continuous heterogeneous diffractive structure STR1. The complementing regions FIL2 may be formed, e.g., by partly or completely filling the grooves U2 of the semi-manufactured element DOE03. The ridges PR1 may include or consist of a first material MAT1. The complementing regions FIL2 may include or consist of a second material MAT2. The ridges PR1 may have a first refractive index $n_1$. The complementing regions FIL2 may have a second refractive index $n_2$. The complementing regions FIL2 are solid regions, and the refractive index $n_2$ is substantially greater than the refractive index (=1) of air.

A ridge PR1 and a first adjacent complementing region FIL2 have a common interface (i.e., the first interface IF1), and the ridge PR1 and a second adjacent complementing region FIL2 have a common interface (i.e., the second interface IF2). Each buried ridge PR1 may have a first interface IF1 toward a first adjacent complementing region FIL2, and a second interface IF2 toward a second adjacent complementing region FIL2. The first interface IF1 has a first slant angle $\theta_1$ with respect to the normal N1 of the major surface SRF1. The second surface IF2 has a second slant angle $\theta_2$ with respect to the normal N1 of the major surface SRF1. The slant angle $\theta_S$ of the ridges PR1 is equal to the average $(\theta_1+\theta_2)/2$ of the slant angles $\theta_1$ and $\theta_2$ of the interfaces IF1 and IF2. The inclined ridges PR1 may be linear ridges. The slant angle $\theta_S$ of the inclined ridges PR1 may be, e.g., in a range of 20° to 70°. The buried ridges PR1 may have a height $d_1$. The height $d_1$ may also be called as a depth of the diffractive grating structure G3 formed by the ridges PR1 and the complementing regions FIL2.

Values of the first and second refractive indices $n_1$ and $n_2$ and a shape of the interfaces IF1 and IF2 may be selected to provide a desired diffraction efficiency of the out-coupling element DOE3 while reducing an amount of light energy diffracted to non-zero transmission orders or to non-zero reflection orders.

The height $d_1$ of the buried inclined diffractive ridges PR1 may be, e.g., in a range of 50% to 150% of the grating period $\Lambda_3$ of the diffractive out-coupling element DOE3. The sufficiently large height $d_1$ of the inclined ridges PR1 may provide large difference between diffraction efficiencies $\eta_{T-1}$ and $\eta_{R-1}$. The symbol $\eta_{T-1}$ denotes a diffraction efficiency in a diffraction order −1 in transmission. The symbol $\eta_{R-1}$ denotes a diffraction efficiency in a diffraction order −1 in reflection. The height $d_1$ may advantageously be, e.g., in a range of 80% to 150% of the grating period $\Lambda_3$.

However, if the height $d_1$ of the inclined ridges PR1 is too large, it may limit a maximum angular width and/or a maximum angular height of the displayed virtual image VIMG1.

Each buried ridge PR1 may be located between two adjacent complementing regions FIL2. Each buried ridge PR1 may have a first common interface IF1 with a complementing region FIL2, which is closer to the in-coupling element (DOE1), and a second common interface IF2 with another complementing region FIL2, which is further from the in-coupling element DOE1.

The ridges PR1 may have the height $d_1$. The ridges PR1 may have a dimension $a_1$ at a half (i.e., $(d_1)/2$) of the height of the ridges. The grooves U2 may have a dimension $a_2$ at the half $((d_1)/2)$ of the height of the ridges. The dimensions $a_1$ and $a_2$ may be defined in a direction, which is perpendicular to a linear orientation of the ridges PR1 and parallel with the first major surface SRF1. A sum $(a_1+a_2)$ of the dimensions $a_1$ and $a_2$ may be equal to the grating period $\Lambda_3$. A height $h_S$ may denote a distance between the complementing regions FIL2 and the major surface SRF2 of the waveguide plate SUB1. A thickness of a planar waveguiding core of the waveguide plate SUB1 may be equal to the height $h_S$.

The buried ridges PR1 and the complementing regions FIL2 may together form the continuous heterogeneous diffractive structure STR1. The continuous heterogeneous diffractive structure STR1 may be implemented without void spaces between the buried ridges PR1 and the complementing regions FIL2. A thickness of the continuous heterogeneous diffractive structure STR1 may be, e.g., equal to the height $d_1$ of the diffractive ridges PR1. The continuous heterogeneous diffractive structure STR1 may extend over the entire length $L_{DOE3}$ of the complemented out-coupling element DOE3. The length $L_{DOE3}$ may be defined in a direction (e.g., SX) which is perpendicular to the diffractive ridges PR1 and is parallel with the first major surface SRF1.

Figure 5A:
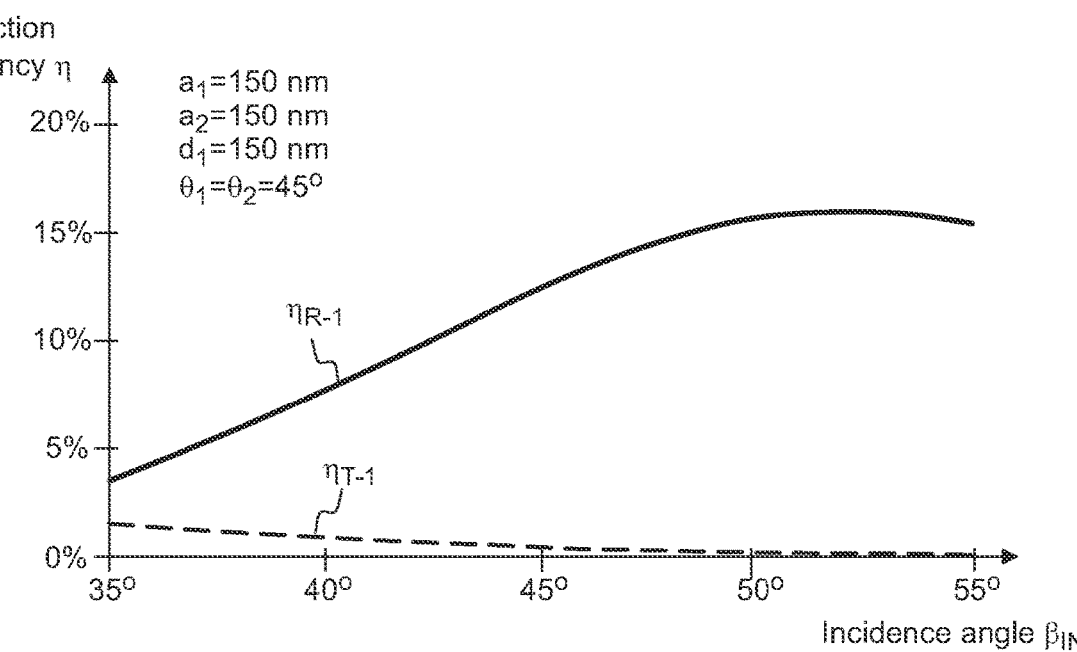
FIG. 5a shows curves illustrating diffraction efficiencies of a complemented out-coupling element according to some embodiments of the present disclosure.

FIG. 5a shows, by way of example, curves illustrating the transmission diffraction efficiency $(\eta_{T-1})$ and the reflection diffraction efficiency $(\eta_{R-1})$, as a function of an incidence angle $\beta_{IN}$. The symbol $\eta_{T-1}$ denotes the diffraction efficiency for the first negative diffraction order $(-1)$ in transmission (T). The symbol $\eta_{R-1}$ denotes the diffraction efficiency for the first negative diffraction order $(-1)$ in reflection (R). The incidence angle $\beta_{IN}$ means an incidence angle of guided light (B1, B2) propagating in the waveguide plate SUB1. In this example, the grating period $\Lambda_3$ is 300 nm, and the dimensions $a_1$, $a_2$, and $d_1$ of the grating structure are equal to 150 nm.

Figure 5B:
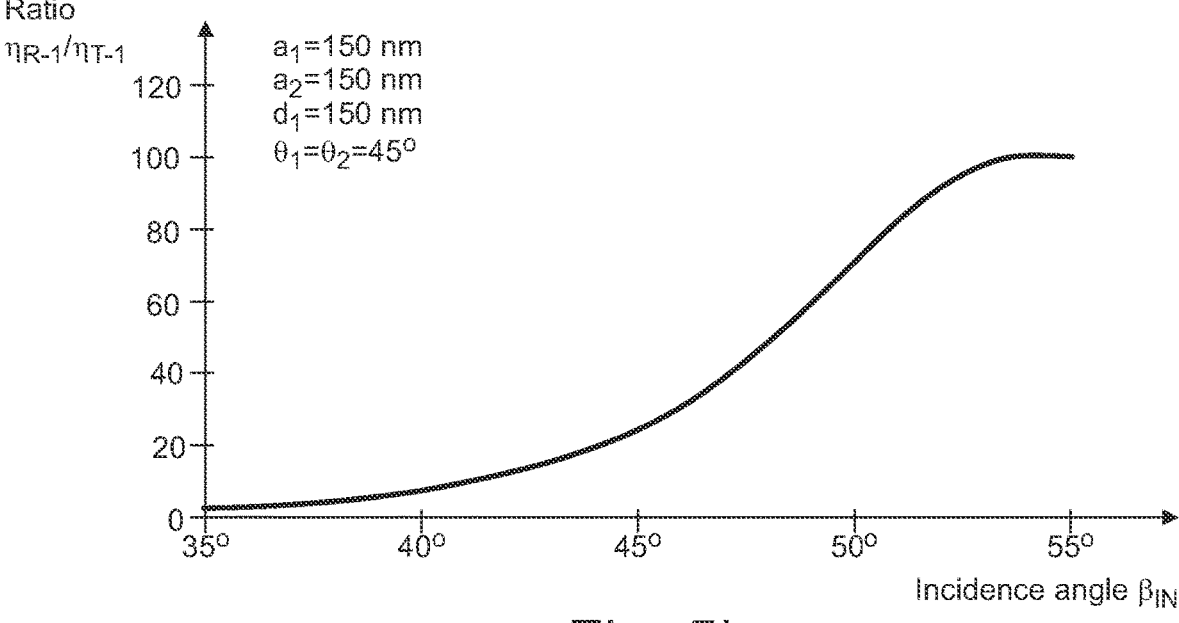
FIG. 5b shows a ratio of a reflection diffraction efficiency for the first negative diffraction order (−1) to a transmission diffraction efficiency for the first negative diffraction order (−1) of the complemented out-coupling element of FIG. 5a, FIG. 5c shows a cross-sectional side view illustrating operation of a complemented out-coupling element according to some embodiments of the present disclosure.

FIG. 5b shows a ratio $(\eta_{R-1})/(\eta_{T-1})$ of the diffraction efficiencies as a function of the incidence angle $\beta_{IN}$. It may be noticed that the ratio $(\eta_{R-1})/(\eta_{T-1})$ may be, e.g., greater than 20 at the incidence angle $\beta_{IN}=45°$. Consequently, e.g., more than 95% of the optical power of the guided light (B1, B2) may be coupled out of the waveguide plate SUB1 towards the eye box BOX1. Consequently, e.g., less than 5% of the optical power of the guided light (B1, B2) may be coupled out of the waveguide plate SUB1 through the wrong major surface SRF1 or SRF2. Furthermore, the diffraction efficiency $\eta_{R-1}$ may be smaller than 15% at the incidence angle $\beta_{IN}=45°$, which means that more than 85% of the optical power of the guided light (B1, B2) may continue to propagate within the waveguide plate SUB1 after diffraction at a single location.

The waveguide plate SUB1 has a critical angle for total internal reflection. The refractive index $n_1$ of the material MAT1 may be, e.g., 1.9, and the corresponding critical angle may be, e.g., 31.8°. Grating parameters of the input grating element DOE1 can be chosen such that an incidence angle $(\beta_{IN})$ of all guided light rays carrying image information within the waveguide plate SUB1 is between the critical angle (31.8°) and 90°.

Figure 5C:
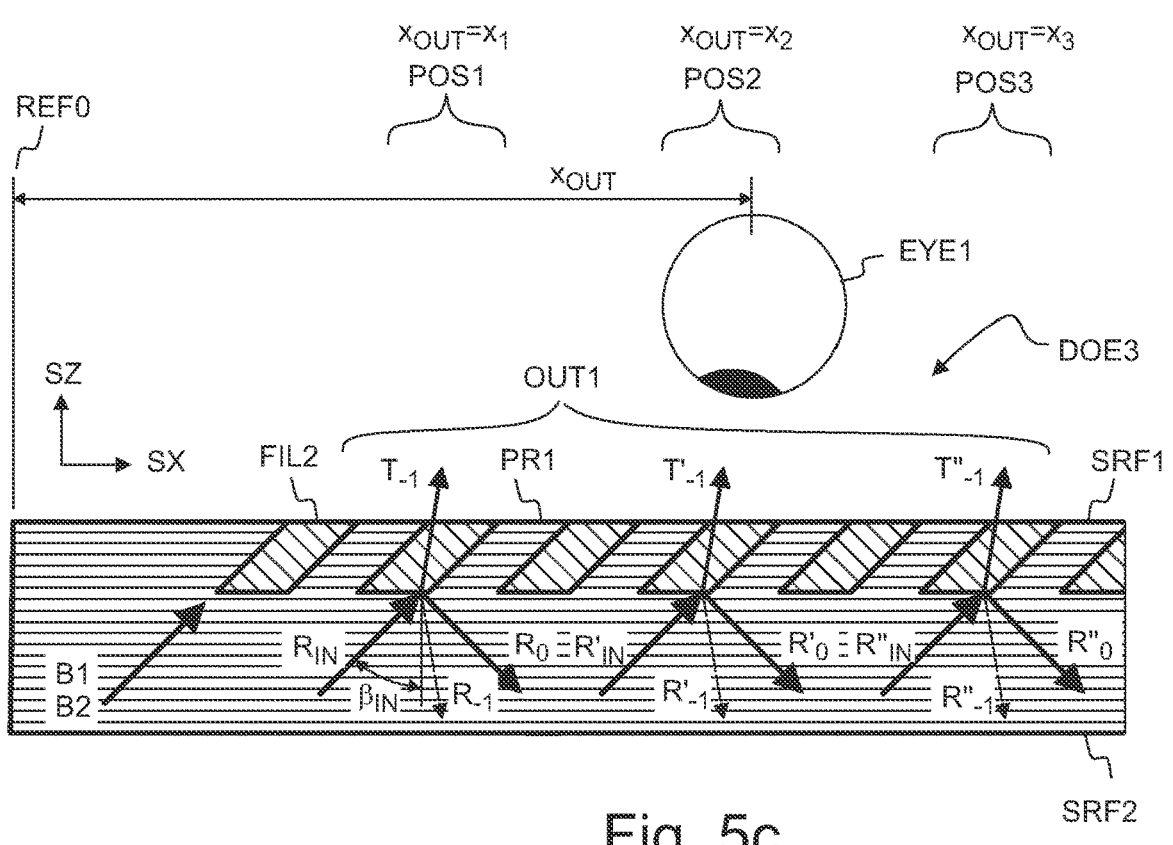
FIG. 5d shows a cross-sectional side view illustrating operation of another complemented out-coupling element according to some embodiments of the present disclosure.
Figure 5D:
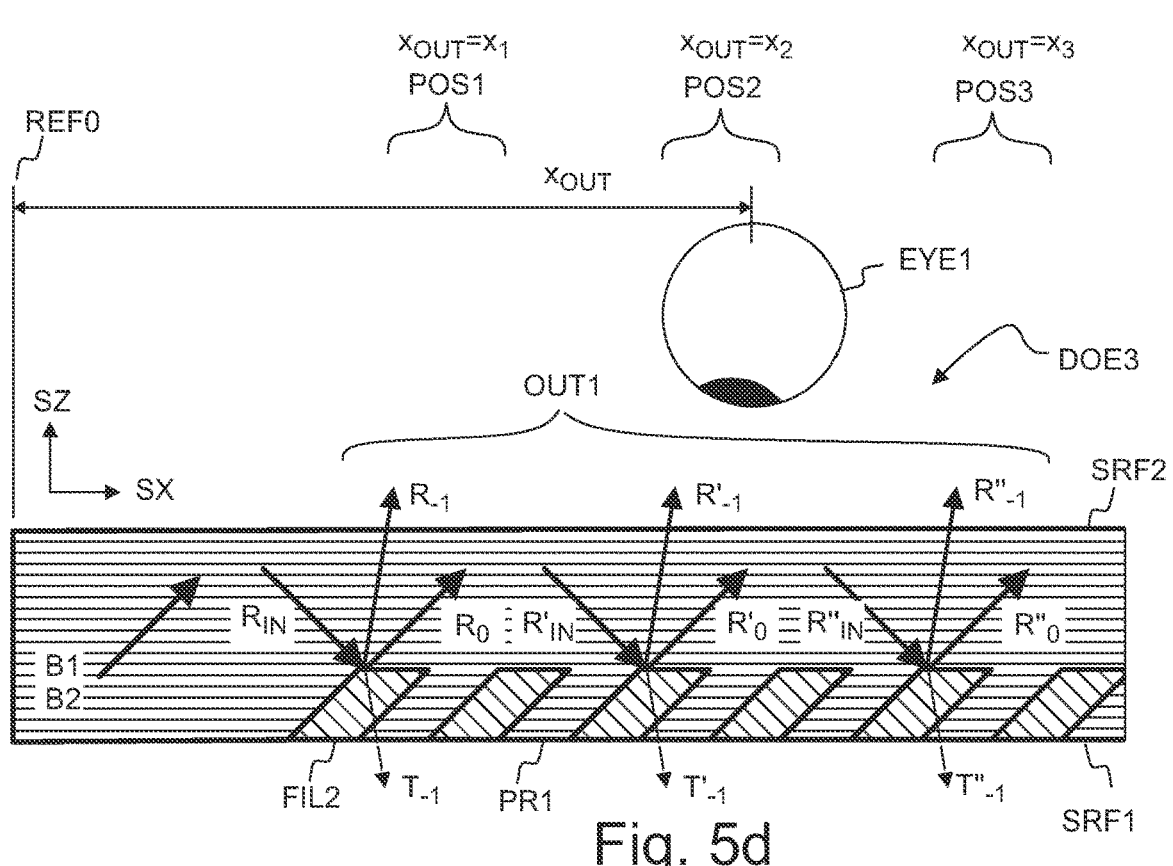

FIG. 5c shows forming output light OUT1 by using the diffractive out-coupling element DOE3 for transmissive out-coupling. FIG. 5d shows forming output light OUT1 by using the diffractive out-coupling element DOE3 for reflective out-coupling.

The guided light (B1, B2) may be repetitively reflected between the major surfaces SRF1 and SRF2 of the waveguide plate SUB1. The guided light B1 or B2 may be reflected and diffracted at several different positions POS1, POS2, and POS3. $R_{IN}$ and $R_0$ denote the guided light (B1, B2) at a first position POS1. $R'_{IN}$ and $R'_0$ denote the guided light (B1, B2) at a second position POS2. $R''_{IN}$ and $R''_0$ denote the guided light (B1, B2) at a third position POS3. The guided light (B1, B2) may have an incidence angle $\beta_{IN}$ with respect to the normal N1 of the first major surface SRF1.

The element DOE3 may diffract guided light in the diffraction order $-1$ in reflection, in the diffraction order $-1$ in transmission, and in the zeroth diffraction order (0). The element DOE3 may form output light $T_{-1}$ by diffracting the guided light $R_{IN}$ in the diffraction order $-1$ in transmission. The element DOE3 may form output light $R_{-1}$ by diffracting the guided light $R_{IN}$ in the diffraction order $-1$ in reflection. The element DOE3 may form the guided light $R_0$ by diffracting the guided light $R_{IN}$ in the zeroth diffraction order.

The zeroth order light $R_0$ may propagate as the guided light from the first position POS1 to the second position POS2, wherein the guided light may be diffracted again by the element DOE3.

$R_{IN}$ denotes the guided light (B1, B2) at the first position POS1. $R'_{IN}$ denotes the guided light (B1, B2) at the second position POS2. $R''_{IN}$ denotes the guided light (B1, B2) at the third position POS3. The intensity of the guided light B1, B2 may decrease with an increasing distance $x_{OUT}$ from a reference position REF0, as a fraction of the optical power of the guided light may be coupled out of the waveguide plate SUB1 at each position of POS1, POS2, and POS3.

The sum $(\eta_{T-1}+\eta_{R-1})$ of the diffraction efficiencies $\eta_{T-1}$ and $\eta_{R-1}$ of the complemented out-coupling element DOE3 may be smaller than a predetermined limit, so as to ensure sufficient intensity of the guided light B1 and B2 at each position of the out-coupling element DOE3. For example, the dimensions $(a_1, a_2, d_1, \theta_1, \theta_2)$ and the refractive indices $(n_1, n_2)$ of the complemented out-coupling element DOE3 may be selected such that the sum $(\eta_{T-1}+\eta_{R-1})$ of the diffraction efficiencies is smaller than 20% for guided light B1, B2 which has the incidence angle $\beta_{IN}=45°$. The sum $(\eta_{T-1}+\eta_{R-1})$ of the diffraction efficiencies may be, e.g., in a range of 2% to 20%.

The out-coupling element DOE3 may form first diffracted light $T_{-1}$ by diffracting the guided light $R_{IN}$ in the first negative transmission diffraction order $(-1)$ at the first position POS1. The first diffracted light $T_{-1}$ may be coupled out of the waveguide plate SUB1 through the first major surface SRF1 of the waveguide plate.

The out-coupling element DOE3 may form second diffracted light $R_{-1}$ by diffracting the guided light $R_{IN}$ in the first negative reflection diffraction order $(-1)$ at the first position POS1. The second diffracted light $R_{-1}$ may be coupled out of the waveguide plate SUB1 through the second major surface SRF2 of the waveguide plate.

The out-coupling element DOE3 may form third diffracted light $R_0$ by diffracting the guided light $R_{IN}$ in the zeroth reflection diffraction order (0) at the first position POS1. The third diffracted light $R_0$ may continue to propagate as the guided light within the waveguide plate SUB1, and the third diffracted light $R_0$ may impinge on the out-coupling element DOE3 as the guided light $R'_{IN}$ at the second position POS2.

The out-coupling element DOE3 may form diffracted light $T_{-1}$ by diffracting guided light $R'_{IN}$ in the first negative transmission diffraction order (−1) at the second position POS2. The diffracted light $T'_{-1}$ may be coupled out of the waveguide plate SUB1 through the first major surface SRF1 of the waveguide plate. The out-coupling element DOE3 may form diffracted light $R'_{-1}$ by diffracting guided light $R'_{IN}$ in the first negative reflection diffraction order (−1) at the second position POS2. The diffracted light $R'_{-1}$ may be coupled out of the waveguide plate SUB1 through the second major surface SRF2 of the waveguide plate. The out-coupling element DOE3 may form the diffracted light $R'_0$ by diffracting guided light $R'_{IN}$ in the zeroth reflection diffraction order (0) at the second position POS2. The diffracted light $R'_0$ may continue to propagate as the guided light within the waveguide plate SUB1, and the diffracted light $R'_0$ may impinge on the out-coupling element DOE3 as guided light $R''_{IN}$ at the third position POS3.

The out-coupling element DOE3 may form diffracted light $T''_{-1}$ by diffracting guided light $R''_{IN}$ in the first negative transmission diffraction order (−1) at the third position POS3. The diffracted light $T''_{-1}$ may be coupled out of the waveguide plate SUB1 through the first major surface SRF1 of the waveguide plate. The out-coupling element DOE3 may form diffracted light $R''_{-1}$ by diffracting the guided light $R''_{IN}$ in the first negative reflection diffraction order (−1) at the third position POS3. The diffracted light $R''_{-1}$ may be coupled out of the waveguide plate SUB1 through the second major surface SRF2 of the waveguide plate. The out-coupling element DOE3 may form diffracted light $R''_0$ by diffracting guided light $R''_{IN}$ in the zeroth reflection diffraction order (0) at the third position POS3. The diffracted light $R''_0$ may continue to propagate as the guided light within the waveguide plate SUB1.

FIG. 5c shows forming output light OUT1 by using the diffractive out-coupling element DOE3 for transmissive out-coupling. Under the circumstances of FIG. 5c, the first diffracted light $T_{-1}$, $T'_{-1}$, and $T''_{-1}$ may contribute to forming the output light OUT1, which is directed to the eye box BOX1. The second diffracted light $R_{-1}$, $R'_{-1}$, and $R''_{-1}$ may be directed to a wrong direction, i.e., away from the eye box BOX1. Thanks to the complemented out-coupling element DOE3, the optical power of light ($T_{-1}$, $T'_{-1}$, and $T''_{-1}$) coupled out through the first major surface SRF1 may be e.g., eleven times greater than the optical power of light ($R_{-1}$, $R'_{-1}$, and $R''_{-1}$) coupled out through the second major surface SRF2. Furthermore, thanks to the complemented out-coupling element DOE3, the intensity of the output light ($T_{-1}$, $T'_{-1}$, and $T''_{-1}$) may be substantially independent of the distance $x_{OUT}$ between the reference position REF0 and the out-coupling position (POS1, POS2, and POS3). The first position POS1 may be at a first distance $x_1$. The second position POS2 may be at a second distance $x_2$. The third position POS3 may be at a third distance $x_3$.

FIG. 5d shows forming output light OUT1 by using the diffractive out-coupling element DOE3 for reflective out-coupling. Under the circumstances of FIG. 5d, the second diffracted light $R_{-1}$, $R'_{-1}$, and $R''_{-1}$ may contribute to forming the output light OUT1, which is directed to the eye box BOX1. The first diffracted light $T_{-1}$, $T'_{-1}$, and $T''_{-1}$ may be directed to the wrong direction, i.e., away from the eye box BOX1. Thanks to the complemented out-coupling element DOE3, the optical power of light ($T_{-1}$, $T'_{-1}$, and $T''_{-1}$) coupled out through the first major surface SRF1 may be, e.g., less than 10% of the optical power of light ($R_{-1}$, $R'_{-1}$, and $R''_{-1}$) coupled out through the second major surface SRF2. Furthermore, thanks to the complemented out-coupling element DOE3, the intensity of the output light ($R_{-1}$, $R'_{-1}$, and $R''_{-1}$) may be substantially independent of the distance $x_{OUT}$.

Figure 6A:
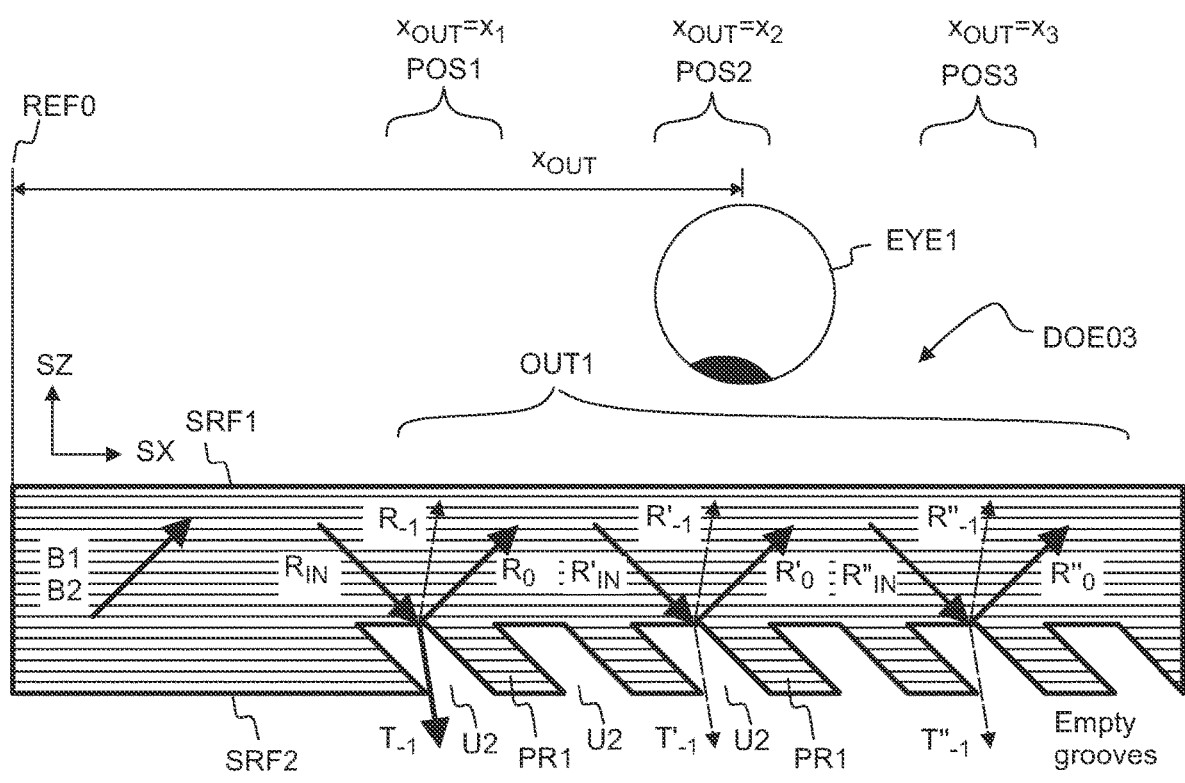
FIG. 6a shows a cross-sectional side view illustrating diffraction of light by a comparative slanted grating.
Figure 6B:
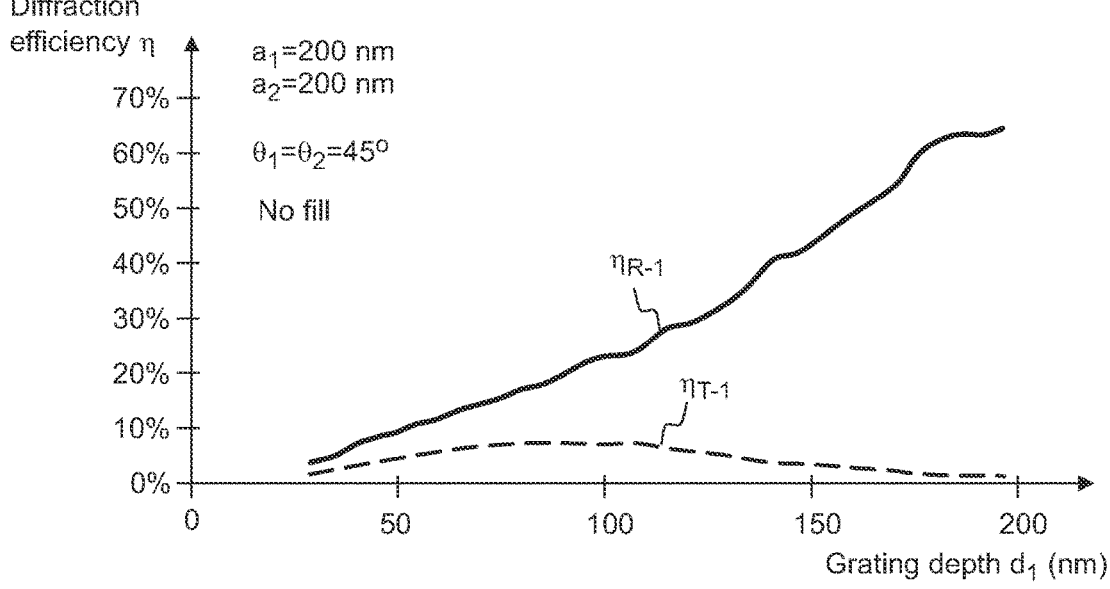
FIG. 6b shows curves illustrating diffraction efficiencies of the comparative slanted grating of FIG. 6a, FIG. 6c shows a cross-sectional side view illustrating operation of a comparative rectangular grating.

FIG. 6a shows a comparative example, where a diffractive structure does not include the complementing regions FIL2. The intensity of output light may exhibit significant variations when the position of the eye EYE1 is changed within the eye box BOX1. The intensity of output light may be high when close to the in-coupling element DOE1, and the intensity of the output light may be low when far from the in-coupling element DOE1. FIG. 6b shows the diffraction efficiencies of the diffractive structure of FIG. 6a. In this comparative example, the sum ($\eta_{T-1}+\eta_{R-1}$) of the diffraction efficiencies is large, and most of the optical power of the guided light is coupled out of the out-coupling element of the waveguide plate SUB1 near a first edge, and the intensity of the guided light B1 and B2 becomes too low in other areas of the out-coupling element.

Figures 6C, 6D:
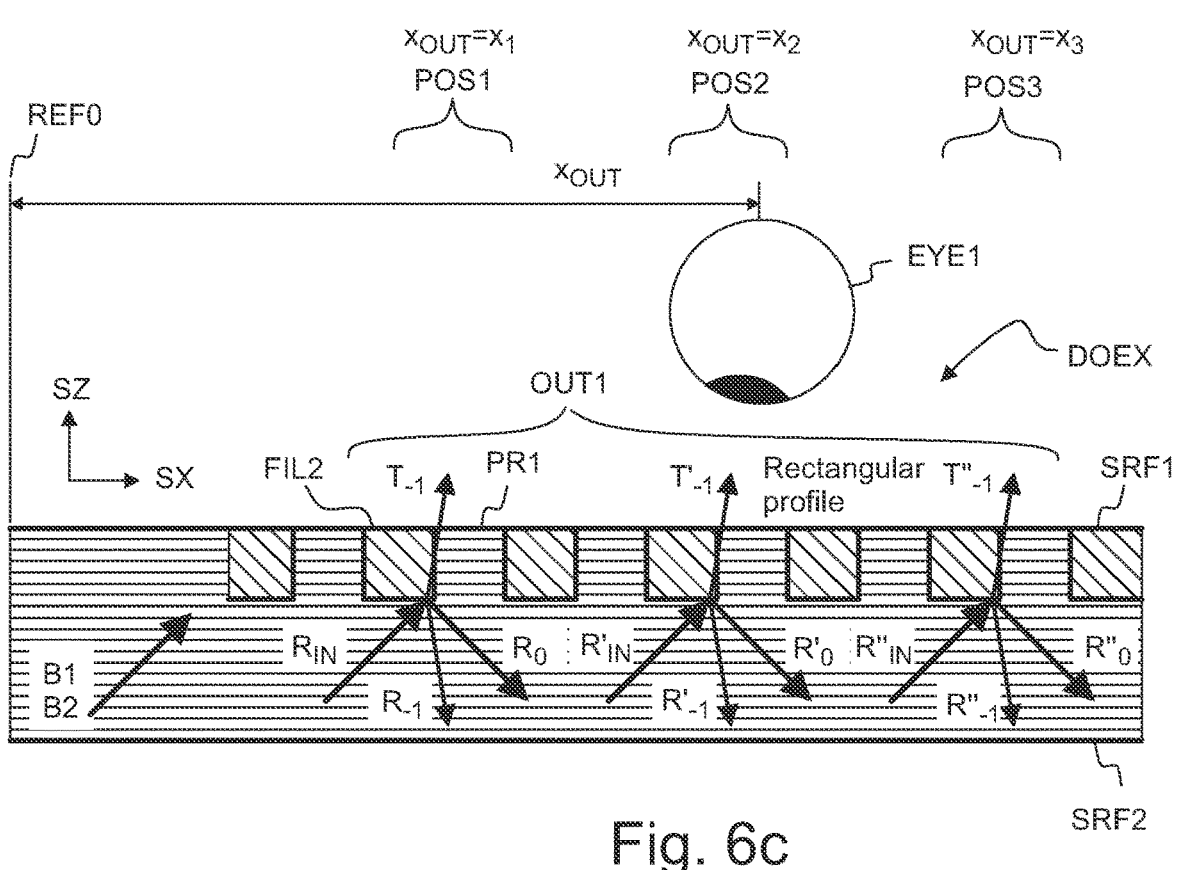
FIG. 6d shows curves illustrating diffraction efficiencies of the rectangular grating of FIG. 6c.

FIG. 6c shows a comparative example, where the diffractive ridges are not inclined. A significant fraction of guided light may be coupled out of the waveguide plate to a wrong direction, away from the eye box BOX1. FIG. 6d shows the diffraction efficiencies of the diffractive structure of FIG. 6c. A difference between the diffraction efficiencies $\eta_{T-1}$ and $\eta_{R-1}$ is so small that significant optical power is directed away from the eye box BOX1.

Figure 7A:
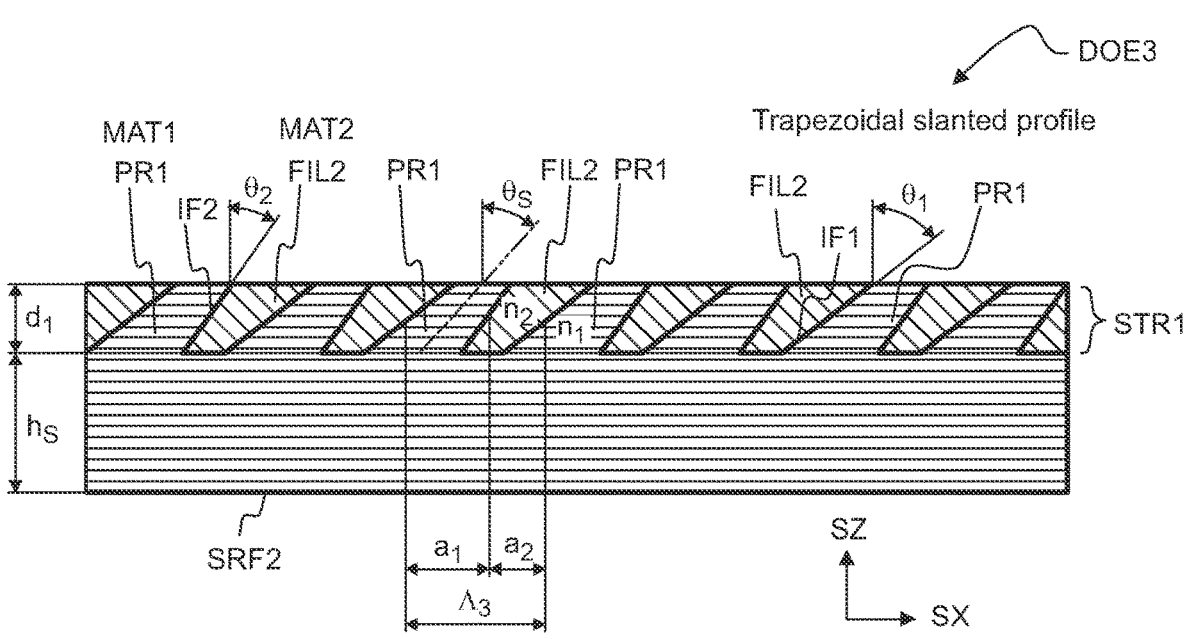
FIG. 7a shows a cross-sectional side view illustrating a complemented out-coupling element which has a trapezoidal profile according to some embodiments of the present disclosure.

Referring to FIG. 7a, a cross-section of the buried ridges PR1 of the complemented out-coupling element DOE3 may have a tapered shape.

Optionally, the cross-section of the buried ridges PR1 may have a trapezoidal shape. The slant angle $\theta_S$ of the ridges PR1 is equal to the average of the slant angles $\theta_1$ and $\theta_2$ of the interfaces IF1 and IF2. A height of the complementing regions FIL2 may be substantially equal to the height $d_1$ of the ridges PR1.

Figure 7B:
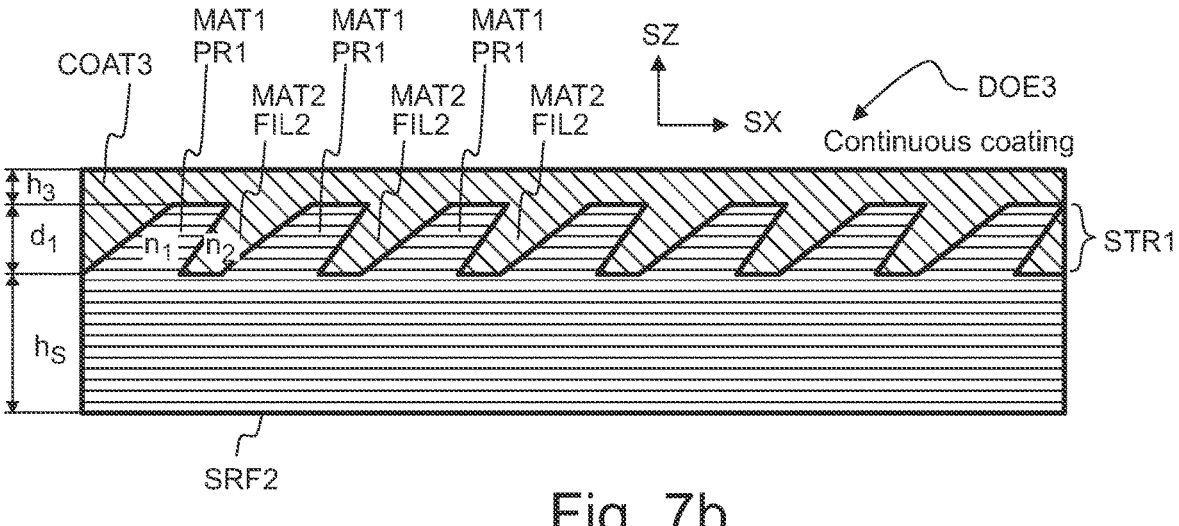
FIG. 7b shows a cross-sectional side view illustrating a complemented out-coupling element in which a material of complementing regions forms a continuous coating on top of diffractive ridges, according to some embodiments of the present disclosure.

Referring to FIG. 7b, the material MAT2 of the complementing regions FIL2 may extend over the buried ridges PR1. The material MAT2 of the complementing regions FIL2 may extend as a continuous layer COAT3 over the buried ridges PR1. The material layer COAT3 on top of the ridges PR1 may have a thickness $h_3$.

Figure 7C:
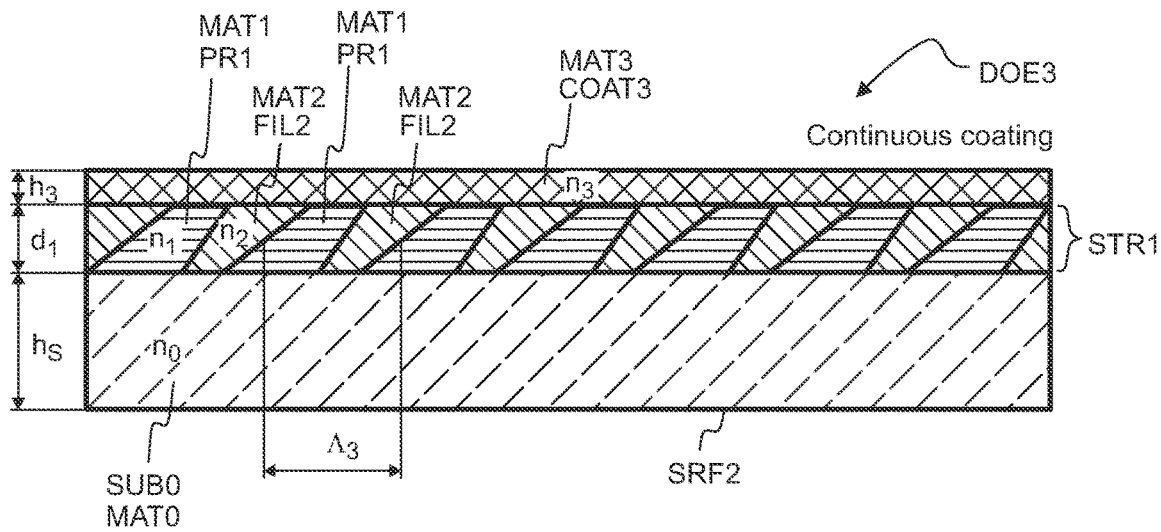
FIG. 7c shows a cross-sectional side view illustrating a complemented out-coupling element which includes an additional coating layer on top of the diffractive ridges.
Figure 7D:
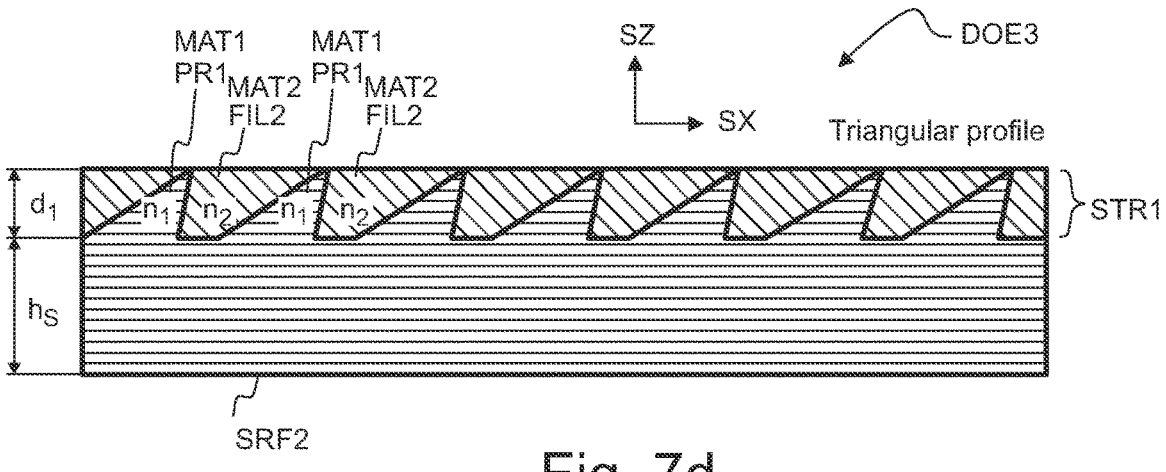
FIG. 7d shows a cross-sectional side view illustrating a complemented out-coupling element which has a triangular profile according to some embodiments of the present disclosure.

Referring to FIG. 7c, the complemented out-coupling element DOE3 may include a continuous material layer COAT3, which extends over the buried ridges PR1. The material layer COAT3 may include or consist of a material MAT3, which is different from the material MAT2 of the complementing regions FIL2. The material layer COAT3 may have a refractive index $n_3$. The refractive index $n_3$ may be different from the refractive index $n_1$ and different from the refractive index $n_2$.

The waveguide plate SUB1 may consist of the same material MAT1 as the ridges PR1, e.g., as shown in FIGS. 7a and 7b. However, a material MAT0 of the waveguide plate SUB1 may also be different from the material MAT1 of the diffractive buried ridges PR1 and different from the material MAT2 of the complementing regions FIL2. The material MAT0 of the waveguide plate SUB1 may have a refractive index $n_0$. The refractive index no may be different from the refractive index $n_1$ and different from the refractive index $n_2$.

Referring to 7d, the cross-section of the buried ridges PR1 of the complemented out-coupling element DOE3 may have a triangular shape.

Figure 7E:
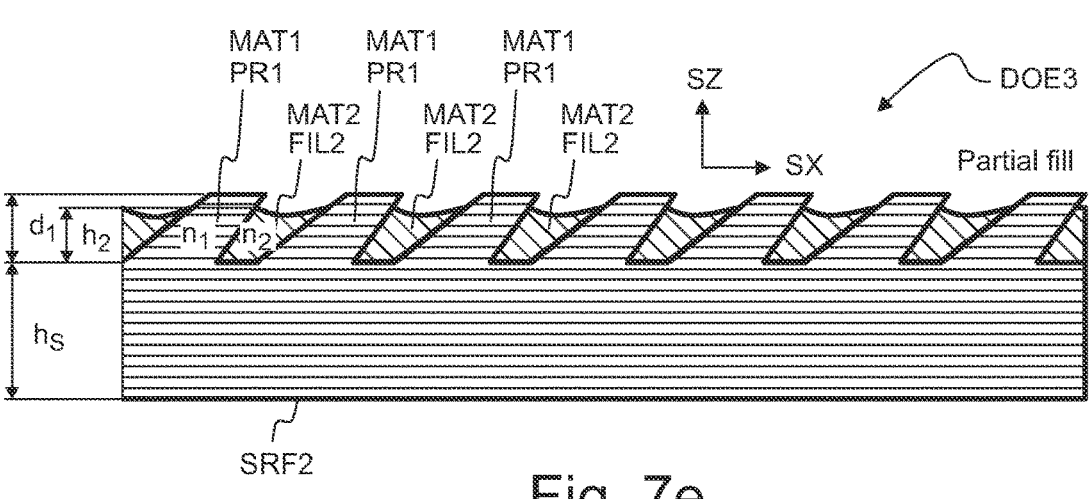
FIG. 7e shows a cross-sectional side view illustrating a complemented out-coupling element which includes partially filled grooves between adjacent diffractive ridges according to some embodiments of the present disclosure.

Referring to FIG. 7e, a height $h_2$ of the complementing regions FIL2 may be smaller than the height $d_1$ of the buried ridges PR1.

Figure 8:
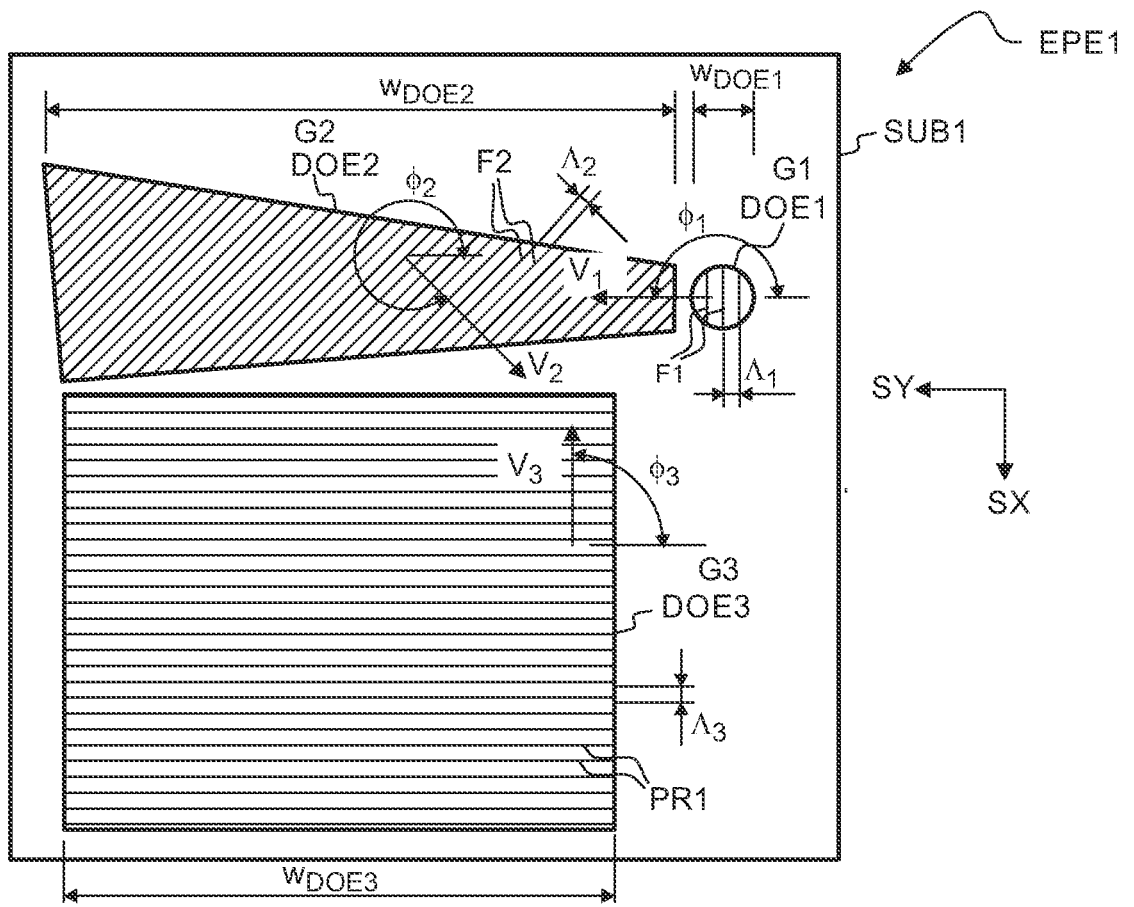
FIG. 8 shows a top view illustrating a beam expander device which includes a complemented out-coupling element according to some embodiments of the present disclosure.

FIG. 8 shows, by way of example, dimensions of the expander device EPE1. The expander device EPE1 may include a group of diffractive elements, which is configured to control a direction of the output light beams. The expander device EPE1 may include diffractive elements, which are formed on the waveguide plate SUB1. The expander device EPE1 may include an in-coupling element DOE1, an expander element DOE2, and an out-coupling element DOE3. The group of the diffractive elements may include the complemented out-coupling element DOE3.

The in-coupling element DOE1 may have a grating period $d_1$. The in-coupling element DOE1 may be implemented as a diffraction grating G1, which has a grating period $\Lambda_1$. The grating G1 includes diffractive features F1. The grating G1 has a grating vector $V_1$. An orientation of the grating vector $V_1$ may be specified, e.g., by an angle $\phi_1$. The orientation of the grating vector $V_1$ may be specified, e.g., with respect to the direction SY, or with respect to the direction –SY, which is opposite to the direction SY. The in-coupling element DOE1 may have a width $w_{DOE1}$ (e.g., in the direction SY).

The expander element DOE2 may have a grating period $d_2$. The element DOE2 may be implemented as a diffraction grating G2, which has a grating period $\Lambda_2$. The grating G2 includes diffractive features F2. The grating G2 has a grating vector $V_2$. An orientation of the grating vector $V_2$ may be specified by an angle $\phi_2$. The element DOE2 may have a width $w_{DOE2}$ (e.g., in the direction SY).

The out-coupling element DOE3 may have a grating period $\Lambda_3$. The element DOE3 may be a complemented out-coupling element, which includes the buried inclined diffractive ridges PR1 and the complementing regions FIL2 between the ridges PR1. The out-coupling element DOE3 may be implemented as the diffraction grating G3, which has the grating period $\Lambda_3$. The grating G3 has a grating vector $V_3$. An orientation of the grating vector $V_3$ may be specified by an angle $\phi_3$. The element DOE3 may have a width $w_{DOE3}$ (e.g., in the direction SY).

A magnitude of a grating vector depends on a grating period of a diffraction grating of a diffractive element, and a direction of the grating vector depends on an orientation of the diffraction grating. For example, a magnitude of the grating vector $V_1$ depends on the grating period $\Lambda_1$ of the diffractive element DOE1. A magnitude of the grating vector $V_2$ depends on the grating period $\Lambda_2$ of the diffractive element DOE2. A magnitude of the grating vector $V_3$ depends on the grating period $\Lambda_3$ of the diffractive element DOE3.

The expander device EPE1 may be designed such that a vector sum of grating vectors of the diffractive elements in the optical path is equal to zero (i.e., $V_1+V_2+V_3=0$), so as to ensure that each of output light beam $B3_{P1}$ and $B3_{P2}$ provided by the out-coupling element DOE3 is parallel with the corresponding input light beam $B0_{P1}$ and $B0_{P2}$ obtained from the optical engine ENG1.

The waveguide plate SUB1 includes a planar waveguiding core. In an embodiment, the plate SUB1 may optionally include, e.g., one or more cladding layers, one or more protective layers, and/or one or more mechanically support-ing layers. The height $h_S$ may mean a thickness of a planar waveguiding core of the plate SUB1.

The waveguide plate SUB1 may include or essentially consist of transparent solid material. The plate SUB1 may include, e.g., glass, polycarbonate, or polymethyl methacry-late (PMMA). The diffractive optical elements may be formed, e.g., by molding, embossing, and/or etching.

The diffractive element DOE1 may be implemented on the first major surface SRF1, on the second major surface SRF2, or inside the waveguide plate SUB1. The diffractive element DOE2 may be implemented on the first major surface SRF1, on the second major surface SRF2, or inside the waveguide plate SUB1. The diffractive element DOE3 may be implemented on the first major surface SRF1, on the second major surface SRF2, or inside the waveguide plate SUB1. An orientation of the diffractive element DOE3 may be selected so as to maximize intensity of the output light OUT1 in the eye box BOX1.

The diffractive elements may be produced, e.g., by using lithographic techniques. For example, one or more emboss-ing tools may be produced by e-beam lithography, and the diffraction gratings may be formed using the one or more embossing tools.

In an embodiment, the diffractive elements DOE1, DOE2, and DOE3 may be implemented on the same major surface SRF1 or SRF2 of the waveguide plate, so as to facilitate manufacturing of the diffractive elements DOE1, DOE2, and DOE3 by embossing.

Figure 9A:
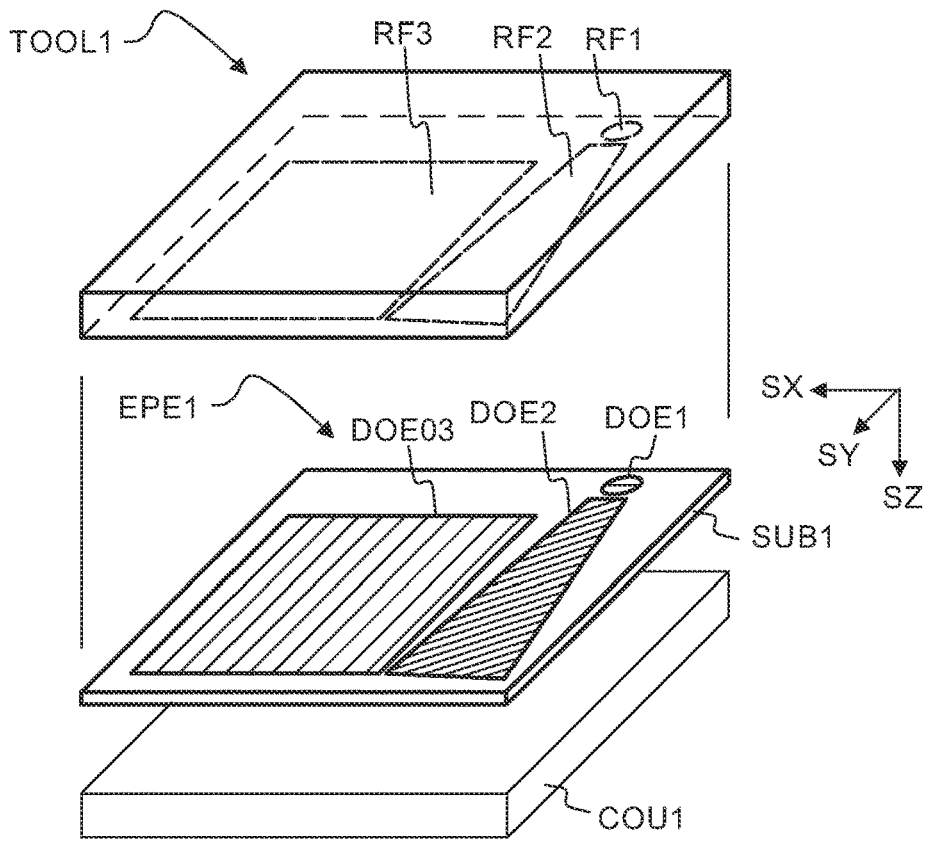
FIG. 9a shows a three-dimensional view illustrating producing a beam expander device by embossing according to some embodiments of the present disclosure.

Referring to FIG. 9*a*, the diffractive elements DOE1, DOE2, and the semi-manufactured element DOE03 may be formed by an embossing tool TOOL1. A method for pro-ducing the display apparatus may include forming one or more diffractive elements DOE1, DOE2, and DOE03 using an embossing tool TOOL1.

The tool TOOL1 may be used as a mold or as an embossing die for forming a surface relief of the diffractive elements. Diffractive features of the elements may be formed by pressing the waveguide plate SUB1 between the tool TOOL1 and a backing COU1. The backing COU1 may support the waveguide plate SUB1 during the pressing. The waveguide plate SUB1 may be, e.g., temporarily heated so as to facilitate forming the diffractive microstructures. A coating layer of the waveguide plate SUB1 may be, e.g., cured so as to make the diffractive ridges PR1 more perma-nent.

The tool TOOL1 may include a first region RF1 for forming the element DOE1. The tool TOOL1 may include a second region RF2 for forming the element DOE2. The tool TOOL1 may include a third region RF3 for forming the semi-manufactured element DOE03. The regions RF1, RF2, and RF3 may include microscopic protrusions for forming the diffractive features of the diffractive optical elements.

Figure 9B:
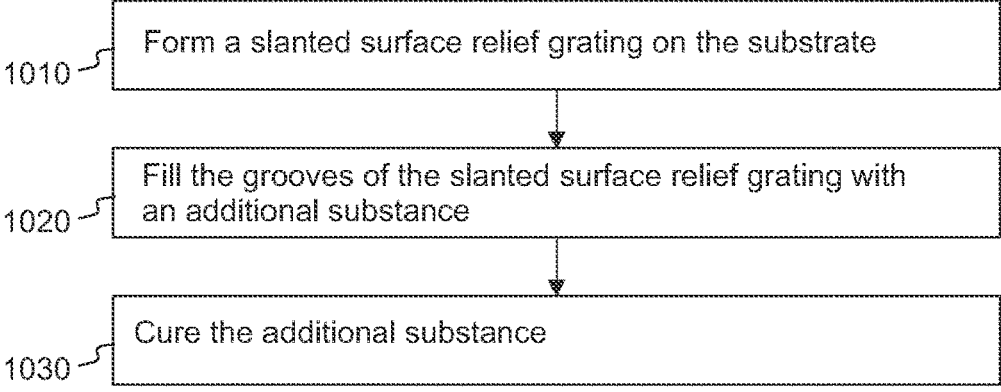
FIG. 9b shows method steps for producing a complemented out-coupling element according to some embodiments of the present disclosure.

Referring to FIG. 9*b*, a method for producing the comple-mented out-coupling element DOE3 may include forming the inclined ridges PR1 of a slanted surface relief grating (DOE03) on the waveguide plate SUB1 (operation 1010). The complementing regions FIL2 may be formed by at least partly filling the grooves U2 of the slanted surface relief grating (DOE03) with the material MAT2, or by at least partly filling the grooves U2 with a precursor of the material MAT2 (operation 1020). The complementing regions FIL2 may be formed, e.g., by spin coating. The material MAT2 may be cured, if needed (operation 1030).

Referring to FIGS. 10*a* to 10*e*, the optical engine ENG1 may form input light IN1, which represents an input image IMG0. The optical engine ENG1 may form the input image IMG0 and may convert the input image IMG0 into a plurality of light beams $B0_{P1}$ and $B0_{P2}$ of the input light IN1. The input light IN1 may include a plurality of input light beams ($B0_{P1}$, $B0_{P2}$) representing the input image IMG0. The optical engine ENG1 may include a display element DISP1 to generate the input image IMG0. The input image IMG0 may include a plurality of image points P1 and P2 arranged in a two-dimensional array. The optical engine ENG1 may include collimating optics LNS1 to form the plurality of input light beams ($B0_{P1}$,$B0_{P2}$) from the image points P1 and P2 of the input image IMG0.

The input image IMG0 may include a center point P0 and four corner points P1, P2, P3, and P4. P1 may denote an upper left corner point. P2 may denote an upper right corner point. P3 may denote a lower left corner point. P4 may denote a lower right corner point. The input image IMG0 may include, e.g., graphical characters "F", "G", and "H". The input image IMG0 may represent displayed information.

The input image IMG0 may be a monochromatic image, or a multi-color image. The input image IMG0 may be, e.g., an RGB image, which may include a red (R) partial image, a green (G) partial image, and a blue (B) partial image. The input image IMG0 may be formed, e.g., by modulating laser light or by modulating light obtained from one or more light emitting diodes.

The optical engine ENG1 may provide input light IN1, which may include a plurality of substantially collimated light beams $B0_{P0}$, $B0_{P1}$, $B0_{P2}$, $B0_{P3}$, and $B0_{P4}$. The light $B0_{P0}$ of the center point P0 may propagate in a direction of an optical axis AXO of the optical engine ENG1.

Figures 10A, 10B, 10C, 10D:
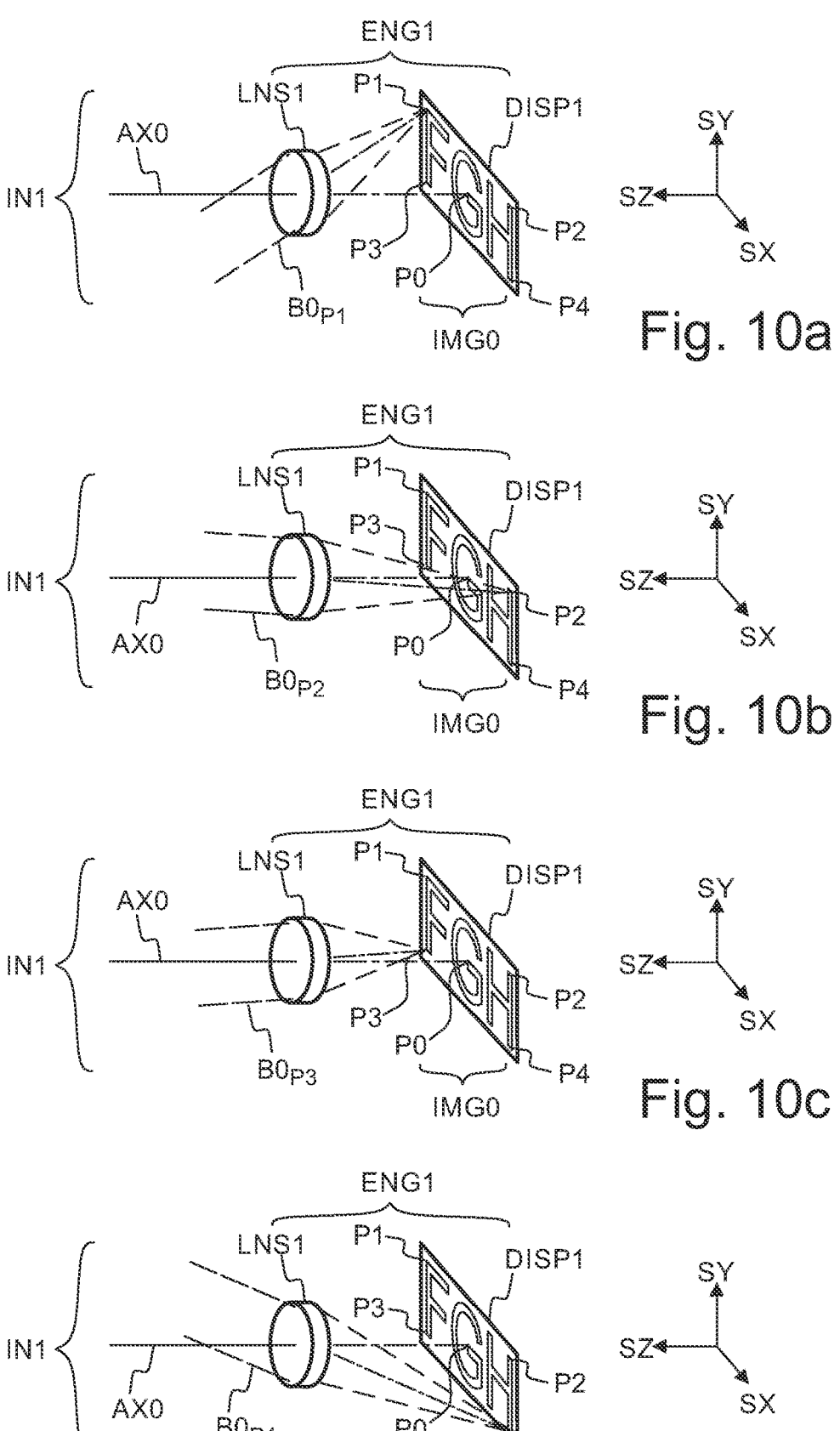
FIG. 10a shows a three-dimensional view illustrating a first input light beam, which corresponds to a first image point of an input image, according to some embodiments of the present disclosure.
FIG. 10b shows a three-dimensional view illustrating a second input light beam, which corresponds to a second image point of the input image, according to some embodiments of the present disclosure.
FIG. 10c shows a three-dimensional view illustrating a third input light beam, which corresponds to a third image point of the input image, according to some embodiments of the present disclosure.
FIG. 10d shows a three-dimensional view illustrating a fourth input light beam, which corresponds to a fourth image point of the input image, according to some embodiments of the present disclosure.
Figure 10E:
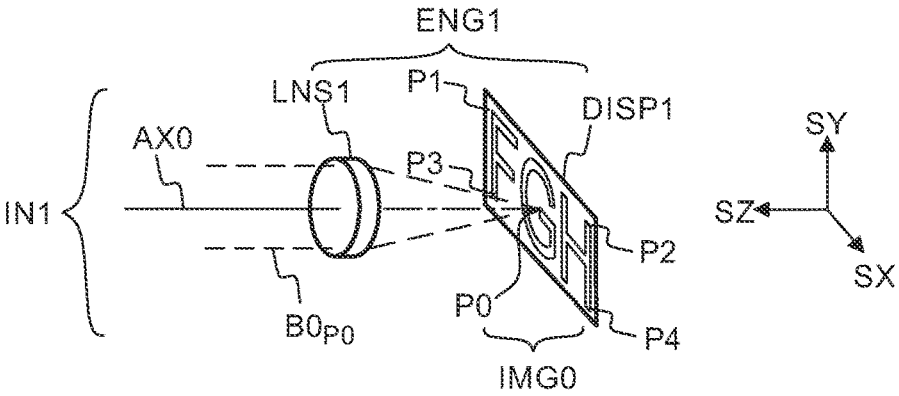
FIG. 10e shows a three-dimensional view illustrating an axial input light beam, which corresponds to a center point of the input image, according to some embodiments of the present disclosure.
Figure 10F:
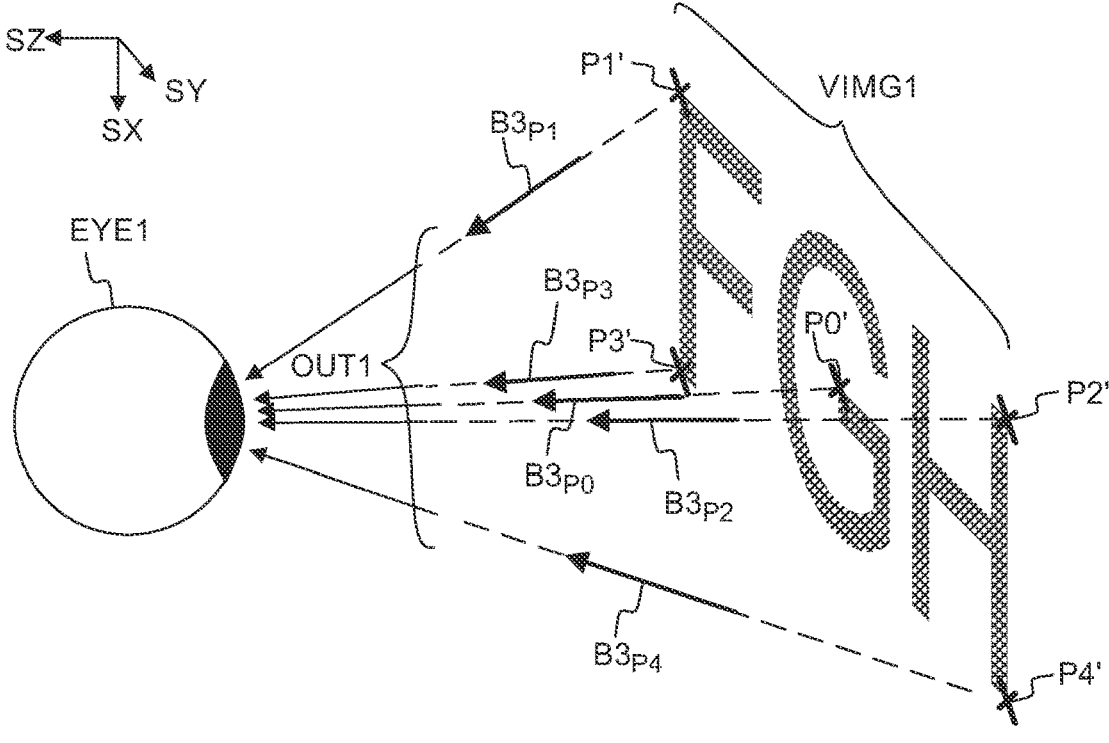
FIG. 10f shows a three-dimensional view illustrating output light beams, which correspond to the image points of the input image, according to some embodiments of the present disclosure.

Referring to FIG. 10f, a displayed virtual image VIMG1 may have a center point P0' and four corner points P1', P2', P3', and P4'. The input light IN1 may include a plurality of partial light beams corresponding to the points P0, P1, P2, P3, and P4 of the input image IMG0. The expander device EPE1 may form the point P0' of the displayed virtual image VIMG1, e.g., by diffracting and guiding light of the point P0 of the input image IMG0. The expander device EPE1 may form the points P1', P2', P3', and P4', e.g., by diffracting and guiding light of the points P1, P2, P3, and P4, respectively.

The output light OUT1 may include a plurality of output light beams $B3_{P0}$, $B3_{P1}$, $B3_{P2}$, $B3_{P3}$, and $B3_{P4}$. The out-coupling element DOE3 of the expander device EPE1 may form the output light beams $B3_{P0}$, $B3_{P1}$, $B3_{P2}$, $B3_{P3}$, and $B3_{P4}$ by diffracting guided light (B1, B2) out of the waveguide plate SUB1. The out-coupling element DOE3 may be arranged to form the output light beams $B3_{P0}$, $B3_{P1}$, $B3_{P2}$, $B3_{P3}$, and $B3_{P4}$ by diffracting the guided light (B1, B2) in the transmission diffraction order ($T_{-1}$) or in the reflection diffraction order ($R_{-1}$).

The output light beam $B3_{P0}$ may be formed from light of the input light beam $B0_{P0}$, which corresponds to the image point P0 of the input image IMG0. The output light beam $B3_{P0}$ appears to originate from a point P0' of the virtual image VIMG1.

The output light beam $B3_{P0}$ may correspond to the image point P0 of the input image IMG0, and to the image point P0' of the virtual image VIMG1. The output light beam $B3_{P1}$ may correspond to the image point P1 of the input image IMG0, and to the image point P1' of the virtual image VIMG1. The output light beam $B3_{P2}$ may correspond to the image point P2 of the input image IMG0, and to the image point P2' of the virtual image VIMG1. The output light beam $B3_{P3}$ may correspond to the image point P3 of the input image IMG0, and to the image point P3' of the virtual image VIMG1. The output light beam $B3_{P4}$ may correspond to the image point P4 of the input image IMG0, and to the image point P4' of the virtual image VIMG1.

The input image IMG0 may represent displayed information. The input image IMG0 may represent, e.g., graphics and/or text. The input image IMG0 may represent, e.g., video. The engine ENG1 may be arranged to generate still images and/or video. The engine ENG1 may generate a real primary image IMG0 from a digital image. The engine ENG1 may receive one or more digital images, e.g., from an internet server or from a smartphone.

The display DISP1 may include a two-dimensional array of display pixels. The display DISP1 may include a two-dimensional array of light-emitting display pixels. The engine ENG1 may include, e.g., one or more light emitting diodes (LED). The display DISP1 may include, e.g., one or more micro display imagers, such as liquid crystal on silicon (LCOS), liquid crystal display (LCD), digital micromirror device (DMD). The display DISP1 may generate an input image IMG0, e.g., at a resolution of 1280×720 (HD). The display DISP1 may generate the input image IMG0, e.g., at a resolution of 1920×1080 (Full HD). The display DISP1 may generate an input image IMG0, e.g., at a resolution of 3840×2160 (4K UHD). The input image IMG0 may include a plurality of image points P0, P1, P2, . . . . The engine ENG1 may include collimating optics LNS1 to form a light beam from each image pixel. The engine ENG1 may include collimating optics LNS1 to form a substantially collimated light beams from light of the image points.

In an embodiment, the expander device EPE1 may be implemented by only two diffractive elements DOE1 and DOE3. The in-coupling element DOE1 may form the first guided light B1. The out-coupling element DOE3 may be arranged to form the output light OUT1 by diffracting the first guided light B1 out of the waveguide plate SUB1. The expander device EPE1 may be implemented without the expander element DOE2. The expander device EPE1 may be implemented by the two diffractive elements DOE1 and DOE3.

In an embodiment, the first expander device EPE1 may include even four diffractive elements, which are configured to control a direction of the output light beams. The four elements may be positioned to define an optical path from the in-coupling element DOE1 to the out-coupling element DOE3. The in-coupling element DOE1 may form guided light B1 by diffracting input light IN1. The expander element DOE2 may form expanded guided light B2 by diffracting the guided light B1. An additional expander element may form additional expanded guided light by diffracting the expanded guided light B2. The out-coupling element DOE3 may form output light by diffracting the additional expanded guided light out of the waveguide plate SUB1.

The above-mentioned diffraction efficiencies may be defined, e.g., for s-polarized light, which has a wavelength of 525 nm in air.

The display device 500 may include the expander device EPE1 and the optical engine ENG1 when delivered to a user. However, the optical engine ENG1 may be a replaceable component of the display device 500. The display device 500 may also be delivered to the user without the optical engine ENG1. The expander device EPE1 and the optical engine ENG1 may be delivered to the user separately, and the user may mount the optical engine ENG1 to the display device 500.

The display device 500 may be arranged to operate, e.g., as a virtual reality display (VR), as an augmented reality display (AR), and/or as a headup display (HUD). For example, a vehicle may include the display device 500 for displaying a virtual image VIMG1 to a user of the vehicle.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display device comprising an expander device to form output light by diffractively expanding input light, wherein the input light comprises a plurality of input light beams representing an input image, and wherein the output light comprises a plurality of output light beams representing said input image, wherein the expander device comprises:

a waveguide plate, a diffractive in-coupling element to couple the input light into the waveguide plate, a diffractive out-coupling element to form the output light by diffracting guided light out of the waveguide plate, wherein the diffractive out-coupling element comprises a plurality of buried diffractive ridges, the diffractive out-coupling element comprises complementing regions between the buried diffractive ridges, the buried diffractive ridges have a first refractive index, the complementing regions have a second different refractive index, and wherein a slant angle of the buried diffractive ridges is in a range of 20° to 70°, wherein the diffractive out-coupling element comprises a continuous covering layer on top of the buried diffractive ridges and on top of the solid complementing regions, the continuous covering layer has a third refractive index different from the first refractive index and the second different refractive index;

wherein the diffractive out-coupling element has a first diffraction efficiency for diffracting the guided light out of the waveguide plate through a first major surface of the waveguide plate, wherein the diffractive out-coupling element has a second diffraction efficiency for diffracting the guided light out of the waveguide plate through a second major surface of the waveguide plate, the out-coupling element forms first diffracted light by diffracting the guided light in a first negative transmission diffraction order, the out-coupling element forms second diffracted light by diffracting the guided light in a first negative reflection diffraction order, and the first diffraction efficiency represents a diffraction efficiency in the first negative transmission diffraction order in transmission, and the second diffraction efficiency represents the first negative reflection diffraction efficiency in a diffraction order in reflection;

wherein dimensions and the refractive indices of the out-coupling element are selected such that a sum of the first diffraction efficiency and the second diffraction efficiency is smaller than 20% for the guided light which has an incidence angle of 45°.

2. The display device of claim 1, wherein a height of the buried diffractive ridges is in a range of 50% to 150% of a grating period of the diffractive out-coupling element.

3. The display device of claim 1, wherein the buried diffractive ridges and the complementing regions together form a continuous heterogeneous diffractive structure.

4. The display device according to claim 1, wherein each buried diffractive ridge has a first interface with a first adjacent complementing region, and a second interface with a second adjacent complementing region.

5. The display device according to claim 1, wherein the first refractive index is in a range of 1.6 to 2.3, and wherein the second refractive index is in a range of 75% to 95% of the first refractive index.

6. The display device according to claim 1, wherein the second refractive index is in a range of 90% to 95% of the first refractive index.

7. The display device according to claim 1, wherein the buried diffractive ridges have a trapezoidal profile or a triangular profile.

8. The display device according to claim 1, wherein the diffractive in-coupling element is arranged to form first guided light by diffracting the input light, the expander device further comprising a diffractive expander element to form second guided light by diffracting the first guided light, wherein the diffractive out-coupling element is arranged to form the output light by diffracting the second guided light out of the waveguide plate.

9. The display device according to claim 1, further comprising an optical engine to form the input light.

10. A method for displaying a virtual image by using a display device, which comprises an expander device to form output light by diffractively expanding input light, wherein the input light comprises a plurality of input light beams representing an input image, and wherein the output light comprises a plurality of output light beams representing said input image, wherein the expander device comprises:

a waveguide plate, a diffractive in-coupling element to couple the input light into the waveguide plate, a diffractive out-coupling element to form the output light by diffracting guided light out of the waveguide plate, wherein the diffractive out-coupling element comprises a plurality of buried diffractive ridges, the diffractive out-coupling element comprises complementing regions between the buried diffractive ridges, the buried diffractive ridges have a first refractive index, the complementing regions have a second different refractive index, and wherein a slant angle of the buried diffractive ridges is in a range of 20° to 70°;

wherein the method comprises:

coupling the input light into the waveguide plate by using the diffractive in-coupling element, and forming the output light by using the diffractive out-coupling element to diffract guided light out of the waveguide plate, wherein the diffractive out-coupling element comprises a continuous covering layer on top of the buried diffractive ridges and on top of the solid complementing regions, the continuous covering layer has a third refractive index different from the first refractive index and the second different refractive index;

wherein the diffractive out-coupling element has a first diffraction efficiency for diffracting the guided light out of the waveguide plate through a first major surface of the waveguide plate, wherein the diffractive out-coupling element has a second diffraction efficiency for diffracting the guided light out of the waveguide plate through a second major surface of the waveguide plate, the out-coupling element forms first diffracted light by diffracting the guided light in a first negative transmission diffraction order, the out-coupling element forms second diffracted light by diffracting the guided light in a first negative reflection diffraction order, and the first diffraction efficiency represents a diffraction efficiency in the first negative transmission diffraction order in transmission, and the second diffraction efficiency represents the first negative reflection diffraction efficiency in a diffraction order in reflection;

wherein dimensions and the refractive indices of the out-coupling element are selected such that a sum of the first diffraction efficiency and the second diffraction efficiency is smaller than 20% for the guided light which has an incidence angle of 45°.

11. A display device comprising an expander device to form output light by diffractively expanding input light, wherein the input light comprises a plurality of input light beams representing an input image, and wherein the output light comprises a plurality of output light beams representing said input image, wherein the expander device comprises:

a waveguide plate, a diffractive in-coupling element to couple the input light into the waveguide plate, a diffractive out-coupling element to form the output light by diffracting guided light out of the waveguide plate, wherein the diffractive out-coupling element comprises a plurality of buried diffractive ridges, the diffractive out-coupling element comprises complementing regions between the buried diffractive ridges, the buried diffractive ridges have a first refractive index, the complementing regions have a second different refractive index, and wherein a slant angle of the buried diffractive ridges is in a range of 20° to 70°, wherein the diffractive out-coupling element comprises a continuous covering layer on top of the buried diffractive ridges and on top of the solid complementing regions, the continuous covering layer has a third refractive index different from the first refractive index and the second different refractive index, wherein the diffractive out-coupling element has a first diffraction efficiency for diffracting the guided light out of the waveguide plate through a first major surface of the waveguide plate, wherein the diffractive out-coupling element has a second diffraction efficiency for diffracting the guided light out of the waveguide plate through a second major surface of the waveguide plate, wherein dimensions of the buried diffractive ridges and the refractive indices have been selected such that a ratio of the first diffraction efficiency to the second diffraction efficiency is greater than 3 or smaller than 0.33, the out-coupling element forms first diffracted light by diffracting the guided light in a first negative transmission diffraction order, the out-coupling element forms second diffracted light by diffracting the guided light in a first negative reflection diffraction order, and the first diffraction efficiency represents symbol denotes a diffraction efficiency in the first negative transmission diffraction order in transmission, and the second diffraction efficiency represents symbol denotes the first negative reflection diffraction efficiency in a diffraction order in reflection.

12. The display device of claim 11, wherein a height of the buried diffractive ridges is in a range of 50% to 150% of a grating period of the diffractive out-coupling element.

13. The display device of claim 11, wherein the buried diffractive ridges and the complementing regions together form a continuous heterogeneous diffractive structure.

14. The display device according to claim 11, wherein each buried diffractive ridge has a first interface with a first adjacent complementing region, and a second interface with a second adjacent complementing region.

15. The display device of claim 11, wherein dimensions and the refractive indices of the out-coupling element are selected such that a sum of the first diffraction efficiency and the second diffraction efficiency is smaller than 20% for the guided light which has an incidence angle of 45°.

16. The display device according to claim 11, wherein the first refractive index is in a range of 1.6 to 2.3, and wherein the second refractive index is in a range of 75% to 95% of the first refractive index.

17. The display device according to claim 11, wherein the second refractive index is in a range of 90% to 95% of the first refractive index.

18. The display device according to claim 11, wherein the buried diffractive ridges have a trapezoidal profile or a triangular profile.

\* \* \* \* \*